US008521080B2

(12) United States Patent
Sakoda et al.

(10) Patent No.: US 8,521,080 B2
(45) Date of Patent: Aug. 27, 2013

(54) RELAY STATION DEVICE, BASE STATION DEVICE, MOBILE STATION DEVICE, AND RADIO COMMUNICATION SYSTEM

(75) Inventors: Kazuyuki Sakoda, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/873,478

(22) Filed: Sep. 1, 2010

(65) Prior Publication Data

US 2011/0065379 A1 Mar. 17, 2011

(30) Foreign Application Priority Data

Sep. 11, 2009 (JP) ................................. 2009-210989

(51) Int. Cl.
*H04B 3/36* (2006.01)
(52) U.S. Cl.
USPC .................. 455/7; 455/15; 455/16; 455/11.1; 455/13.1; 370/311
(58) Field of Classification Search
None
See application file for complete search history.

(56) References Cited

U.S. PATENT DOCUMENTS

| 7,710,917 | B2 | 5/2010 | Kato |
|---|---|---|---|
| 2003/0236087 | A1 | 12/2003 | Stenton |
| 2005/0026626 | A1 | 2/2005 | Carl et al. |
| 2005/0130598 | A1 | 6/2005 | Dowling |
| 2005/0227616 | A1* | 10/2005 | Takatani et al. .............. 455/11.1 |
| 2006/0073786 | A1 | 4/2006 | Sarkar |
| 2007/0037570 | A1 | 2/2007 | Donovan et al. |
| 2007/0054640 | A1 | 3/2007 | Wada et al. |
| 2008/0090551 | A1* | 4/2008 | Gidron et al. ................. 455/406 |
| 2009/0047962 | A1 | 2/2009 | Rao |
| 2009/0068944 | A1 | 3/2009 | Kang et al. |
| 2009/0113038 | A1* | 4/2009 | Godwin ........................ 709/224 |
| 2009/0181664 | A1 | 7/2009 | Kuruvilla et al. |
| 2009/0207749 | A1 | 8/2009 | Roskowski |
| 2009/0279420 | A1 | 11/2009 | Koyanagi et al. |
| 2010/0240388 | A1 | 9/2010 | Nakatsugawa |
| 2011/0065379 | A1 | 3/2011 | Sakoda et al. |
| 2011/0065466 | A1 | 3/2011 | Sakoda et al. |
| 2011/0090832 | A1* | 4/2011 | Horiuchi et al. .............. 370/311 |
| 2011/0186633 | A1* | 8/2011 | Okabe et al. .................. 235/439 |

FOREIGN PATENT DOCUMENTS

| EP | 1 463 354 A1 | 9/2004 |
|---|---|---|
| EP | 1 890 505 A1 | 2/2008 |
| EP | 1 940 185 A1 | 7/2008 |

(Continued)

*Primary Examiner* — Fayyaz Alam
*Assistant Examiner* — Mohammed Rachedine
(74) *Attorney, Agent, or Firm* — Wolf, Greenfield & Sacks, P.C.

(57) ABSTRACT

There is provided a relay station including a base station-relay station resource allocation request-transmission section which transmits a base station-relay station resource allocation request indicating that allocation of a base station-relay station resource is requested, the base station-relay station resource being a resource used by a radio signal transmitted/received between a base station and the relay station, to the base station using a radio signal, a base station-relay station resource allocation response-reception section which receives base station-relay station resource information indicating the base station-relay station resource from the base station using a radio signal, as a base station-relay station resource allocation response which is a response with respect to the base station-relay station resource allocation request, and a base station-relay station resource information storage section which stores the base station-relay station resource information received by the base station-relay station resource allocation response-reception section.

15 Claims, 20 Drawing Sheets

(56) References Cited

FOREIGN PATENT DOCUMENTS

| | | |
|---|---|---|
| EP | 1940185 A1 * | 7/2008 |
| FR | 2 866 186 A1 | 8/2005 |
| JP | 11-127108 A | 5/1999 |
| JP | 2001-094502 A | 4/2001 |
| JP | 2001-160867 A | 6/2001 |
| JP | 2002-026798 A | 1/2002 |
| JP | 2002-353876 A | 12/2002 |
| JP | 2004-510372 A | 4/2004 |
| JP | 2005-513931 A | 5/2005 |
| JP | 2005-203949 A | 7/2005 |
| JP | 2006-352620 A | 12/2006 |
| JP | 2008-048218 A | 2/2008 |
| JP | 2008-048236 A | 2/2008 |
| JP | 2008-048416 A | 2/2008 |
| JP | 2008-048417 A | 2/2008 |
| JP | 2008-109374 A | 5/2008 |
| JP | 2008-118659 A | 5/2008 |
| JP | 2008-536409 A | 9/2008 |
| JP | 2009-017547 A | 1/2009 |
| JP | 2009-130790 A | 6/2009 |
| JP | 2009-528804 A | 8/2009 |
| WO | WO 96/07288 A1 | 3/1996 |
| WO | WO 99/33298 A1 | 7/1999 |
| WO | WO 03/055246 A1 | 7/2003 |
| WO | WO 2008/106797 A1 | 9/2008 |
| WO | WO 2008/119892 A1 | 10/2008 |
| WO | WO 2009/069948 A2 | 6/2009 |
| WO | WO 2009/072191 A1 | 6/2009 |

* cited by examiner

US 8,521,080 B2

RELAY STATION DEVICE, BASE STATION DEVICE, MOBILE STATION DEVICE, AND RADIO COMMUNICATION SYSTEM

BACKGROUND OF THE INVENTION

1. Field of the Invention

The present invention relates to a relay station device, a base station device, a mobile station device, and a radio communication system. More specifically, the present invention relates to, in a cellular system in which a mobile station device connects wirelessly to a network via a base station device, a communication methodology for the mobile station device to communicate not only with the base station device, but also with a relay station device which is connected wirelessly to the base station device.

2. Description of the Related Art

In a cellular radio communication system (hereinafter, may be simply referred to as "radio communication system"), there is a case where a relay station device (hereinafter, may be simply referred to as "relay station") is installed for the purpose of extending a service area covered by a base station device (hereinafter, may be simply referred to as "base station"). The base station connects to and provides a communication path to any mobile station device (hereinafter, may be simply referred to as "mobile station"), and the base station also connects to and provides a communication path to the relay station. The relay station further connects to and provides a communication path to another mobile station. In such configuration, the mobile station can communicate with the base station via the relay station. In this way, even when the mobile station is located outside a service area within which a service is provided by the base station, the mobile station can perform communication as long as the mobile station is located within a service area covered by the relay station.

As for a radio communication system including a relay station, there is disclosed, for example, a methodology for reducing the burden on the relay station (e.g., see JP-A-2008-118659). Further, for example, in order to reduce the processing performed in the relay station, there are disclosed techniques for adjusting a timing of a base station transmitting data to a relay station, taking into consideration the occurrence of a time lag in performing data transmission from the relay station to a mobile station (e.g., see JP-A-2008-48218 and JP-A-2008-109374).

Further, as for a channel allocation control method in a radio communication system including a relay station, there is disclosed a method of controlling the allocation of channels on the basis of a total average data rate (e.g., see JP-A-2008-48416). In addition, as for an operation method of an antenna pattern in a radio communication system including a relay station, there is disclosed a method for accelerating link establishment by switching array antennas (e.g., see JP-A-2008-48236).

When a service area can be expanded by installing a relay station in addition to a base station, it becomes possible for service providers to create a radio communication system with less investment.

SUMMARY OF THE INVENTION

However, a radio communication system including a relay station was considered based on the case where a base station was connected to a mobile station via a relay station, and it was left out of consideration the configuration in which the relay station itself was an endpoint of data. Under such circumstances, it was necessary that the relay station itself be installed as a part of the service providers' infrastructure facility, and it was also necessary that the relay station, although the relay station is cheaper than the base station, be installed by the service providers themselves.

In light of the foregoing, it is desirable to provide a novel and improved technology for enabling the relay station to provide a communication path between a mobile station and a base station and the relay station to be an endpoint of communication.

According to an embodiment of the present invention, there is provided a relay station device which includes a base station-relay station resource allocation request-transmission section which transmits a base station-relay station resource allocation request indicating that allocation of a base station-relay station resource is requested, the base station-relay station resource being a resource used by a radio signal transmitted/received between a base station device and the relay station device, to the base station using a radio signal, a base station-relay station resource allocation response-reception section which receives base station-relay station resource information indicating the base station-relay station resource from the base station device using a radio signal, as a base station-relay station resource allocation response which is a response with respect to the base station-relay station resource allocation request, and a base station-relay station resource information storage section which stores the base station-relay station resource information received by the base station-relay station resource allocation response-reception section.

The relay station device may further include a base station-side relay resource allocation request-transmission section which transmits a base station-side relay resource allocation request indicating that allocation of a base station-side relay resource is requested to the base station device using a radio signal, the base station-side relay resource being a resource used by a radio signal transmitted/received between the base station device and the relay station device among radio signals transmitted/received between the base station device and a mobile station device via the relay station device, a base station-side relay resource allocation response-reception section which receives base station-side relay resource information indicating the base station-side relay resource from the base station device using a radio signal, as a base station-side relay resource allocation response which is a response with respect to the base station-side relay resource allocation request, and a base station-side relay resource information storage section which stores the base station-side relay resource information received by the base station-side relay resource allocation response-reception section.

The relay station device may further include a mobile station-side relay resource allocation request-transmission section which transmits a mobile station-side relay resource allocation request indicating that allocation of a mobile station-side relay resource is requested to the base station device using a radio signal, the mobile station-side relay resource being a resource used by a radio signal transmitted/received between the mobile station device and the relay station device among radio signals transmitted/received between the base station device and the mobile station device via the relay station device, a mobile station-side relay resource allocation response-reception section which receives mobile station-side relay resource information indicating the mobile station-side relay resource from the base station device using a radio signal, as a mobile station-side relay resource allocation response which is a response with respect to the mobile station-side relay resource allocation request, and a mobile station-side relay resource information storage section which stores the mobile station-side relay resource information received by the mobile station-side relay resource allocation response-reception section.

The relay station device may further include a radio signal reception section which receives a radio signal, a data extraction section which extracts, when a resource used by the radio signal received by the radio signal reception section is a resource indicated by the base station-relay station resource information stored in the base station-relay station resource information storage section, data from the radio signal, and a data storage section which stores the data extracted by the data extraction section.

The relay station device may further include a radio signal transmission section which transmits, when a resource used by the radio signal received by the radio signal reception section is a resource indicated by the base station-side relay resource information stored in the base station-side relay resource information storage section, a radio signal which uses the mobile station-side relay resource indicated by the mobile station-side relay resource information stored in the mobile station-side relay resource information storage section.

When a resource used by the radio signal received by the radio signal reception section is a resource indicated by the mobile station-side relay resource information stored in the mobile station-side relay resource information storage section, the radio signal transmission section may transmit a radio signal which uses the base station-side relay resource indicated by the base station-side relay resource information stored in the base station-side relay resource information storage section.

The relay station device may further include a display section, and a display control section which extracts the data from the data storage section and causes the display section to display the extracted data.

The data extraction section may further extract display control information for controlling a display from the radio signal. The data storage section may further store the display control information extracted by the data extraction section. The display control section may extract the data from the data storage section and may cause the display section to display the extracted data, based on the display control information stored in the data storage section.

The relay station device may further include a mobile station-relay station resource allocation request-transmission section which transmits a mobile station-relay station resource allocation request indicating that allocation of a mobile station-relay station resource is requested to the base station device using a radio signal, the mobile station-relay station resource being a resource used by a radio signal transmitted/received between a mobile station device and the relay station device, a mobile station-relay station resource allocation response-reception section which receives mobile station-relay station resource information indicating the mobile station-relay station resource from the base station device using a radio signal, as a mobile station-relay station resource allocation response which is a response with respect to the mobile station-relay station resource allocation request, and a mobile station-relay station resource information storage section which stores the mobile station-relay station resource information received by the mobile station-relay station resource allocation response-reception section.

The relay station device may further include a radio signal transmission section which transmits a radio signal which uses the mobile station-relay station resource indicated by the mobile station-relay station resource information stored in the mobile station-relay station resource information storage section, and a transmission control section which extracts data from the data storage section and causes the radio signal transmission section to transmit the extracted data using a radio signal.

The relay station device may further include a radio signal transmission section which is capable of transmitting a radio signal which uses the base station-relay station resource indicated by the base station-relay station resource information stored in the base station-relay station resource information storage section, an inventory data acquisition section which acquires, from a vending machine, inventory data inside the vending machine, an inventory data storage section which stores the inventory data acquired by the inventory data acquisition section, and a transmission control section which extracts the inventory data stored in the inventory data storage section and causes the radio signal transmission section to transmit the extracted inventory data using a radio signal.

A charge for communication performed by the relay station may be calculated based on information related to at least one of radio signal transmission using the base station-side relay resource, radio signal reception using the base station-side relay resource, radio signal transmission using the mobile station-side relay resource, and radio signal reception using the mobile station-side relay resource, which are performed by the relay station.

According to the embodiment of the present invention described above, it becomes possible for the relay station to provide the communication path between the mobile station and the base station, and the relay station to be an endpoint of communication.

DETAILED DESCRIPTION OF THE EMBODIMENTS

Figure 1:
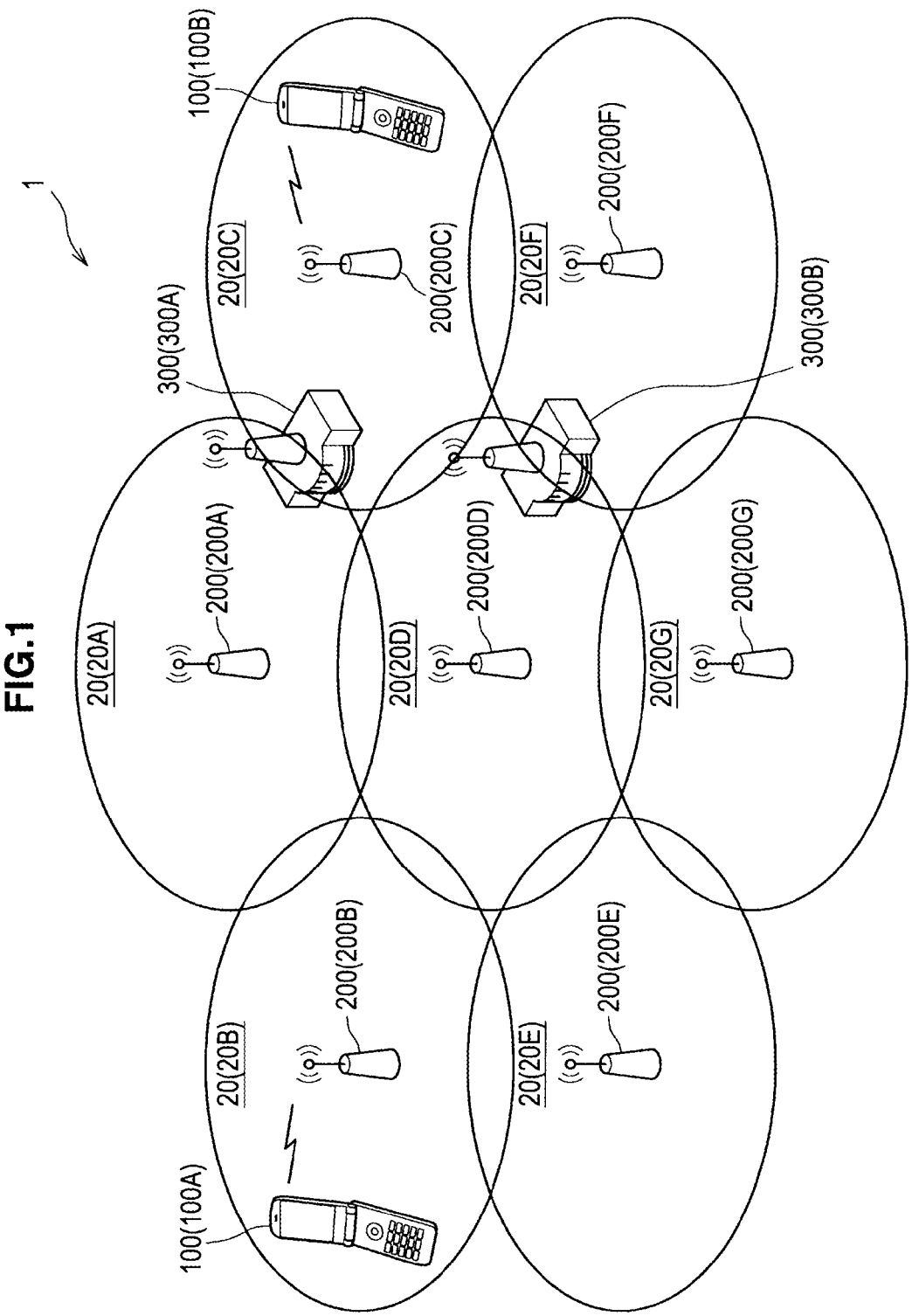
FIG. 1 is a diagram showing a configuration example of a radio communication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment
   1-1. Study on advertisement distribution method
   1-2. Issues of advertisement distribution mode
   1-3. Outline of means for solving issues
   1-4. Outline of radio communication system according to present embodiment
   1-5. Outline of relay station in radio communication system
   1-6. Definition of logical link types
   1-7. Examples of usage of frequency resources
   1-8. Channel usage by relay station
   1-9. Example of hardware configuration of mobile station
   1-10. Example of functional configuration of mobile station
   1-11. Example of hardware configuration of base station
   1-12. Example of functional configuration of base station
   1-13. Example of hardware configuration of relay station
   1-14. Example of functional configuration of relay station
   1-15. Signal processing of relay station
   1-16. Specific example of relay station (part 1: case of electronic signboard)
   1-17. Specific example of relay station 300 (part 2: case of vending machine)
   1-18. Example of charging system
2. Modified example
3. Summary <1. First Embodiment>

[1-1. Study on Advertisement Distribution Method]

Nowadays, an advertisement system using an electronic display device tends to be used as a signboard. This is something that is generally called digital signage system. In the system, there is an advantage in that a displayed content can be momentarily changed, and hence, there is expected higher advertising effect than the advertising effect of a painted signboard. In order to change the display content, it is necessary to transfer display data to the display device, and there is a case where a radio communication system is used for delivering the display data to the display device. For example, there is actually given a display device provided with a radio communication device corresponding to a mobile station of the radio communication system, which delivers display data to the radio communication device by the radio communication system and displays a display content based on the display data delivered to the radio communication device.

In addition, as a method of propagating advertisement information further effectively, there is disclosed a system in which effective advertisement distribution is performed in such a manner that a terminal which received advertisement information from an information station displays an advertisement and then transfers the advertisement information to another terminal (e.g., see JP-A-2002-298006). In the system, when the information station is regarded as a base station, an advertisement display device corresponds to a mobile station, and the mobile station transfers the content displayed on the display device thereof to another mobile station, to thereby enable the same advertisement to be transferred to the display of the other mobile station.

[1-2. Issues of Advertisement Distribution Mode]

As described above, when an electronic display device is provided with a radio communication device corresponding to a mobile station of the radio communication system, there is provided a display device which switches a display content based on display data distributed to the radio communication device. In the device, a communication station provided to the display device is a mobile station, and hence, there was an issue that communication charge occurs for the data distribution for distributing the display content to the display device.

Further, in a system in which advertisement information is propagated by exchanging the advertisement information between mobile stations, it is based on the premise that identical information is propagated, and hence, there was an issue that a limit occurred to the information which could be distributed. In addition, since the data propagation is performed between the mobile stations, there was an issue that it was difficult, when the mobile station tries to obtain propagation data, to identify where to obtain the information.

[1-3. Outline of Means for Solving Issues]

Consequently, when a relay station includes an output device such as an electronic display device, the relay station provides a communication path to a mobile station while operating as an electronic signboard. In this way, a base station can provide a connection to the mobile station with the base station and can send content that is unique to the relay station to the mobile station, while distributing data for electronic signboard to the relay station.

Further, when the relay station is connected to a device such as a vending machine, the relay station can, while performing communication with the base station on data related to inventory information of the vending machine (inventory data), provide a connection to the mobile station with the base station.

When the above usage is realized, service providers can adopt a form in which the installment of the relay station is entrusted to a third party, and hence, it becomes possible for the service providers to expand the service area without directly investing in the relay station by themselves. At the same time, those who install the relay station can receive a reduction in the cost for communication addressed to the relay station, owing to the relay station contributing to a relay of communication between the mobile station and the base station.

[1-4. Outline of Radio Communication System According to Present Embodiment]

FIG. 1 is a diagram showing a configuration example of a radio communication system according to a first embodiment of the present invention. As shown in FIG. 1, it is known as a cellular radio communication system that a system in which a mobile station 100 wirelessly communicates with a base station 200 which is installed on a rooftop of a building or the like and a base station 200 connects to an outside network 40.

A so-called cellular phone system is one example of the cellular radio communication system.

In a radio communication system 1, a service provider installs many base stations 200 and develops service areas in such a manner that the mobile station 100 can connect to the base station 200 wherever the mobile station 100 is located. This state is shown in FIG. 1. In FIG. 1, a service area 20 represents an area within which communication with the base station 200 is assumed to be performed. The area which can provide a service to the base station 200 is referred to as, for example, cell. When the mobile station 100 is located, for example, within a service area 20E and a service area 20D, the mobile station 100 is connected to a base station 200E and a base station 200D, respectively. In this way, by changing the base stations 200 to be connected to depending on the place at which the mobile station 100 is located, the connection between the mobile station 100 and the base station 200 is not interrupted even in the case where the mobile station 100 is transferred.

In the system, at the edge of the service area 20, the mobile station 100 can receive signals from multiple base stations 200. For this reason, there is a case where respective base stations 200 are arranged in such a manner that service areas 20 provided with services from base stations 200 using the same frequency channel do not overlap with each other. This example will be described with reference to FIG. 2.

Figure 2:
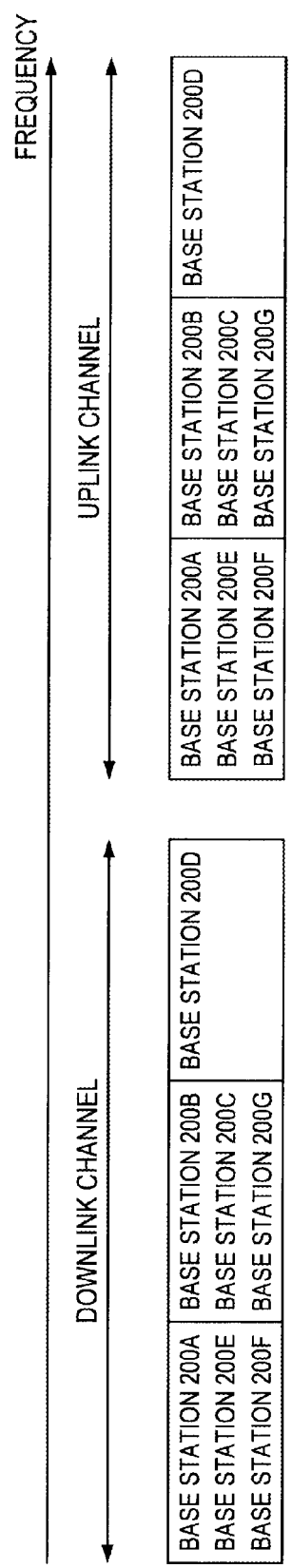
FIG. 2 is a diagram showing an example of usage of a frequency resource according to the embodiment.

FIG. 2 is a diagram showing an example of usage of a frequency resource, which schematically shows the way in which the frequency resource allocated to a service provider is used. In most of the radio communication systems 1, there is adopted a mode called FDD (Frequency Division Duplex), in which different frequency bands are allocated to an uplink channel (channel in a direction from the mobile station 100 to the base station 200) and a downlink channel (channel in a direction from the base station 200 to the mobile station 100). In addition, the uplink channel and the downlink channel are each further compartmentalized, and in a certain base station 200, a frequency channel is allocated such that only a part thereof is used. Accordingly, by systematically arranging the base stations 200 in such a manner that the same frequency band is not shared between the base stations 200 placed adjacently to each other, the system is controlled not to cause interference.

Information on the radio communication system 1 is described in detail in, for example, "Digital Mobile Communication" ISBN-4-905577-26-8, supervising editor: Moriji Kuwabara, so please refer to those documents for detail. A base station 200 transmits/receives a signal necessary for the communication with the mobile station 100 within a frequency band whose availability in the base station 200 is preliminarily set.

Figure 3:
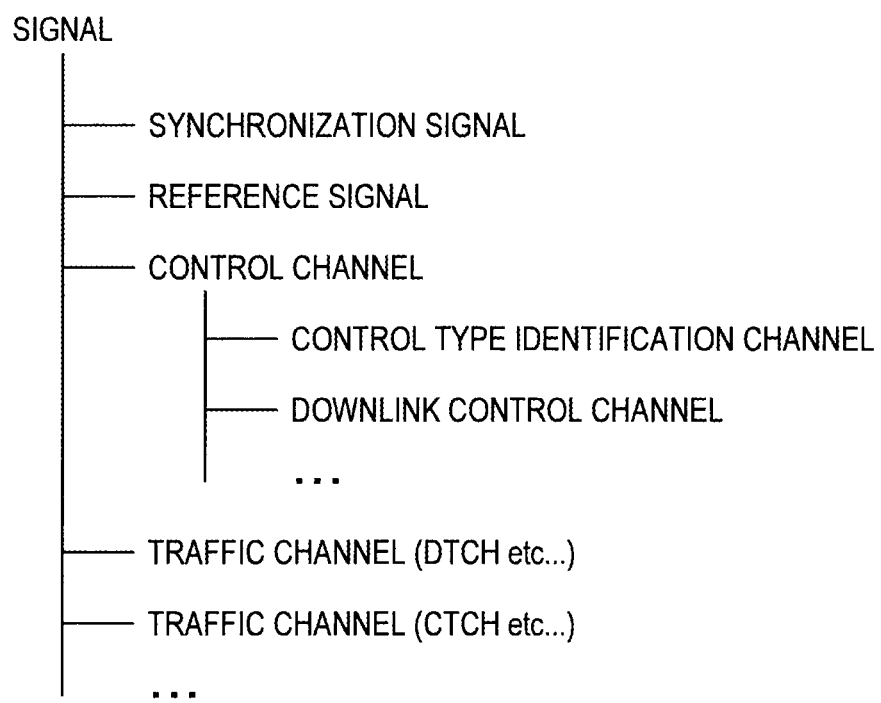
FIG. 3 is a summarized diagram of signal types transmitted by a base station according to the embodiment.

FIG. 3 is a summarized diagram of signal types transmitted by a base station. First, the base station 200 transmits a synchronization signal at regular intervals to the mobile station 100 for the purpose of notifying the mobile station 100 that the base station 200 is present and also notifying the mobile station 100 of a reference time of the base station 200. By receiving the synchronization signal, the mobile station 100 detects that the base station 200 is present in the periphery thereof, and extracts information on timing at which the signal is to be received in order to receive a control signal.

Further, the base station 200 transmits a reference signal at regular intervals in a known pattern, and the reference signal is used for estimating a transmission path of a symbol in which information is modulated. In addition, the base station 200 transmits a control channel for notifying the mobile station 100 of control information. The control channel is a signal that can be demodulated and received depending on timing information obtained from the synchronization signal and the transmission path estimation results obtained from the reference signal. The mobile station 100 can extract brief information of the base station 200 by receiving the control channel As the control channel, there are defined multiple kinds of control channels, and the mobile station 100 first receives a control type identification channel to thereby obtain basic information on which frequency band and at which timing the control channel is transmitted in that cell. In accordance with the basic information, the mobile station 100 receives a downlink control channel. Accordingly, the mobile station 100 acquires a system parameter and the like, and determines whether it is possible to communicate with the base station 200 and whether to perform communication, for example. In the case where the mobile station 100 actually communicates with the base station 200, the mobile station 100 notifies the base station 200 of a traffic channel allocation request, and a traffic channel is allocated to the mobile station 100 from the base station 200.

There are mainly two types in the channel that carries traffic: a DTCH (Dedicated Traffic Channel) which is a dedicated channel addressed to a specific mobile station 100; and a CTCH (Common Traffic Channel) which is a common channel addressed to an unspecified number of mobile stations 100. When communicating with a specific mobile station 100, the base station 200 uses the DTCH, and when performing broadcast or multicast communication addressed to the unspecified number of mobile stations 100, the base station 200 uses the CTCH. Here, although a dedicated traffic channel is referred to as DTCH and a channel for broadcast or multicast communication is referred to as CTCH, they may be referred to in different name and may be referred to in any name.

Signal formats used in the radio communication system 1 are described in, for example, 3GPP TS 36.211 (3rd Generation Partnership Project; Technical Specification Group Radio Access Network; Evolved Universal Terrestrial Radio Access (E-UTRA); Physical Channels and Modulation), and 3GPP TS 36.213 (3rd Generation Partnership Project; Technical Specification Group Radio Access Network; Evolved Universal Terrestrial Radio Access (E-UTRA); Physical layer procedures), so please refer to those documents for detail.

[1-5. Outline of Relay Station in Radio Communication System]

Figure 4:
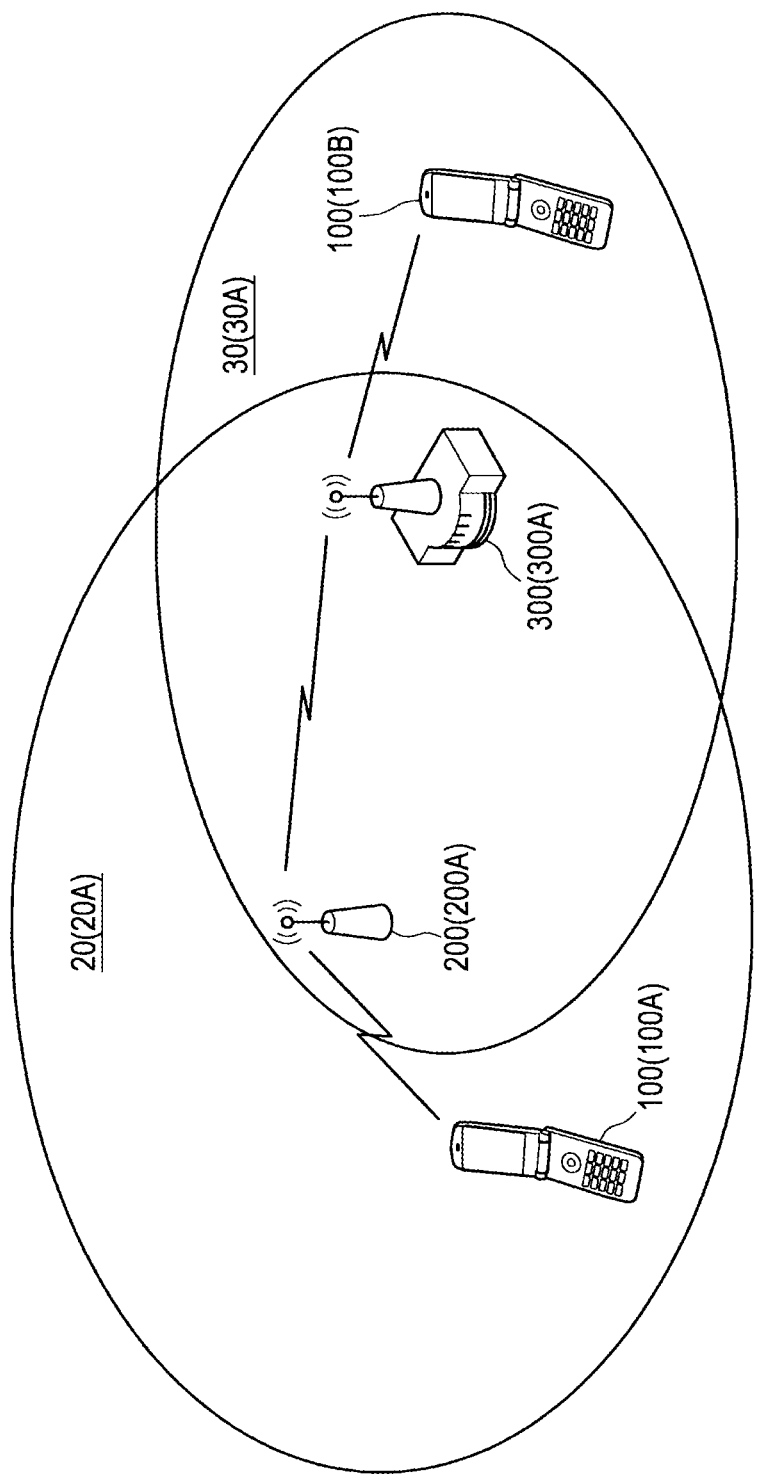
FIG. 4 is a diagram illustrating an outline of a relay station according to the embodiment.

In the above, description is given on the case where the mobile station 100 in the radio communication system 1 communicates only with the base station 200. However, there can also be considered a case where a relay station 300 is installed for the purpose of extending a service area covered by the base station 200, for example. FIG. 4 is a diagram illustrating an outline of the relay station 300. With reference to FIG. 4, a form in which the relay station 300 is present in the radio communication system 1 will be described.

A base station 200A connects to and provides a communication path to any mobile station 100A, and at the same time, the base station 200A also connects to and provides a communication path to a relay station 300A. The relay station 300A further connects to and provides a communication path to a mobile station 100B, which is another mobile station from the mobile station 100A. In such configuration, the mobile station 100B can communicate with the base station 200A via the relay station 300A. In this way, even when the mobile station 100B is located outside a service area 20A within which a service is provided by the base station 200A, the mobile station 100B can perform communication as long as the mobile station 100B is located within a service area 30A covered by the relay station 300A.

In general, the relay station 300 as described above can be made into a device with less cost than the base station 200. Therefore, when it becomes possible to locate the relay station 300 as described above, a service provider can develop the service area 30 by installing the relay station 300 instead of the base station 200 depending on circumstances, and hence, the service provider can provide services while holding down investment.

[1-6. Definition of Logical Link Types]

Figure 6:
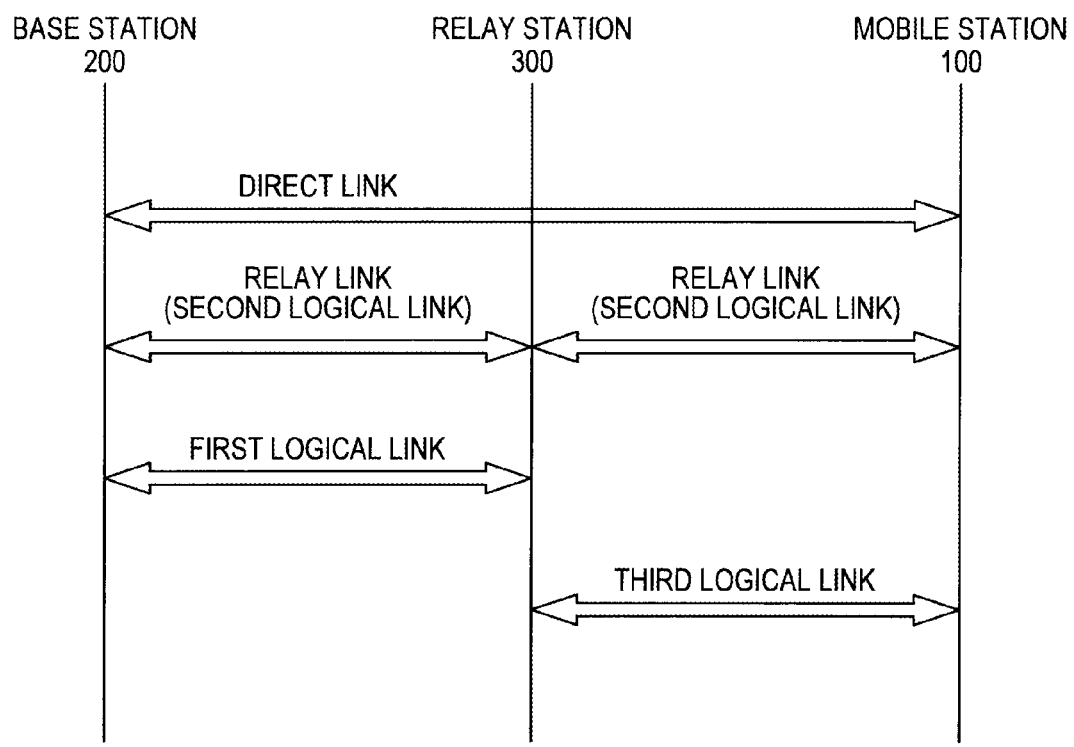
FIG. 6 is a diagram showing types of logical links according to the embodiment.

FIG. 6 is a diagram showing types of logical links according to the present embodiment. With reference to FIG. 6, the types of logical links according to the present embodiment will be described. In the radio communication system 1 according to the present embodiment, in the same manner as in a general cellular radio communication system, there is a direct link which is directly installed between the base station 200 and the mobile station 100. Further, in the case where the radio communication system 1 includes the relay station 300, there is a relay link which connects the mobile station 100 with the base station 200 via the relay station 300. In the present embodiment, the relay link is defined as a second logical link The second logical link physically has a configuration in which the mobile station 10 connects to the relay station 300 and the relay station 300 connects to the base station 200. However, as a logical link, the mobile station 100 is connected to the base station 200 in the same manner as the direct link. Therefore, authentication of the mobile station 100, which is performed prior to the start of communication, is not performed at the relay station 300 but is performed at the base station 200 or at a control center connected to the base station 200. When the second logical link is established, the base station 200 starts communication with the relay station 300 via the second logical link, and the relay station 300 relays data, which is transmitted/received between the relay station 300 and the base station 200 via the second logical link, to the mobile station 100 via the second logical link. Further, the relay station 300 relays data, which is transmitted/received between the relay station 300 and the mobile station 100 via the second logical link, to the base station 200 via the second logical link In addition to the second logical link, there is a link which is provided between the base station 200 and the relay station 300 and causes the relay station 300 to operate as an endpoint of communication, and the link is defined as a first logical link. The first logical link is established independently of presence/absence of the mobile station 100, and is used for the purpose of distributing data from the base station 200 to the relay station 300.

In addition, there is also a link which is provided for performing closed data communication between the relay station 300 and the mobile station 100, and the link is defined as a third logical link. In the case where the mobile station 100 uses the third logical link, the mobile station 100 does not connect to the base station 200, and hence the mobile station 100 cannot connect to a wide area network 40 by using the third logical link. Further, while the authentication of the mobile station 100 is performed at the base station 200 or at a control center when the second logical link is provided, the authentication of the mobile station 100 is performed at the relay station 300 when the third logical link is provided. Therefore, there is a possibility that information of the mobile station 100 connected by the third logical link may not be obtained by the base station 200 or the network 40 side to which the base station 200 is connected.

Note that all of those logical links are dynamically established by a communication request from the mobile station 100 or the relay station 300, or by paging (calling) from the network 40 side to which the base station 200 is connected. Typically, with the establishment of the logical link, allocation of frequency resources, which is to be described later, is performed. That is, the first logical link, the second logical link, and the third logical link may be or may not be established depending on time period. At the time of establishing the third logical link, when the relay station 300 determines that the allocation of a new frequency resource is necessary with the establishment of the third logical link, the relay station 300 issues a third logical link-use frequency resource allocation request to the base station 200. In the case of accepting the request, the base station 200 notifies the relay station 300 of, as a response result, control information indicating which frequency resource is allowed to be used, and allocates a frequency resource in which the third logical link is accommodated to the relay station 300. The relay station 300 establishes the third logical link between the relay station 300 and the mobile station 100 by using the allocated third logical link-use frequency resource.

[1-7. Examples of Usage of Frequency Resources]

With reference to FIG. 13 to FIG. 18, examples of the frequency resource allocation will be described. FIG. 13 to FIG. 18 each diagrammatically show an example of downlink channel usage in the radio communication system 1. First, description will be given on the case where frequency resources under the base station 200 are allocated by time-division.

Figure 13:
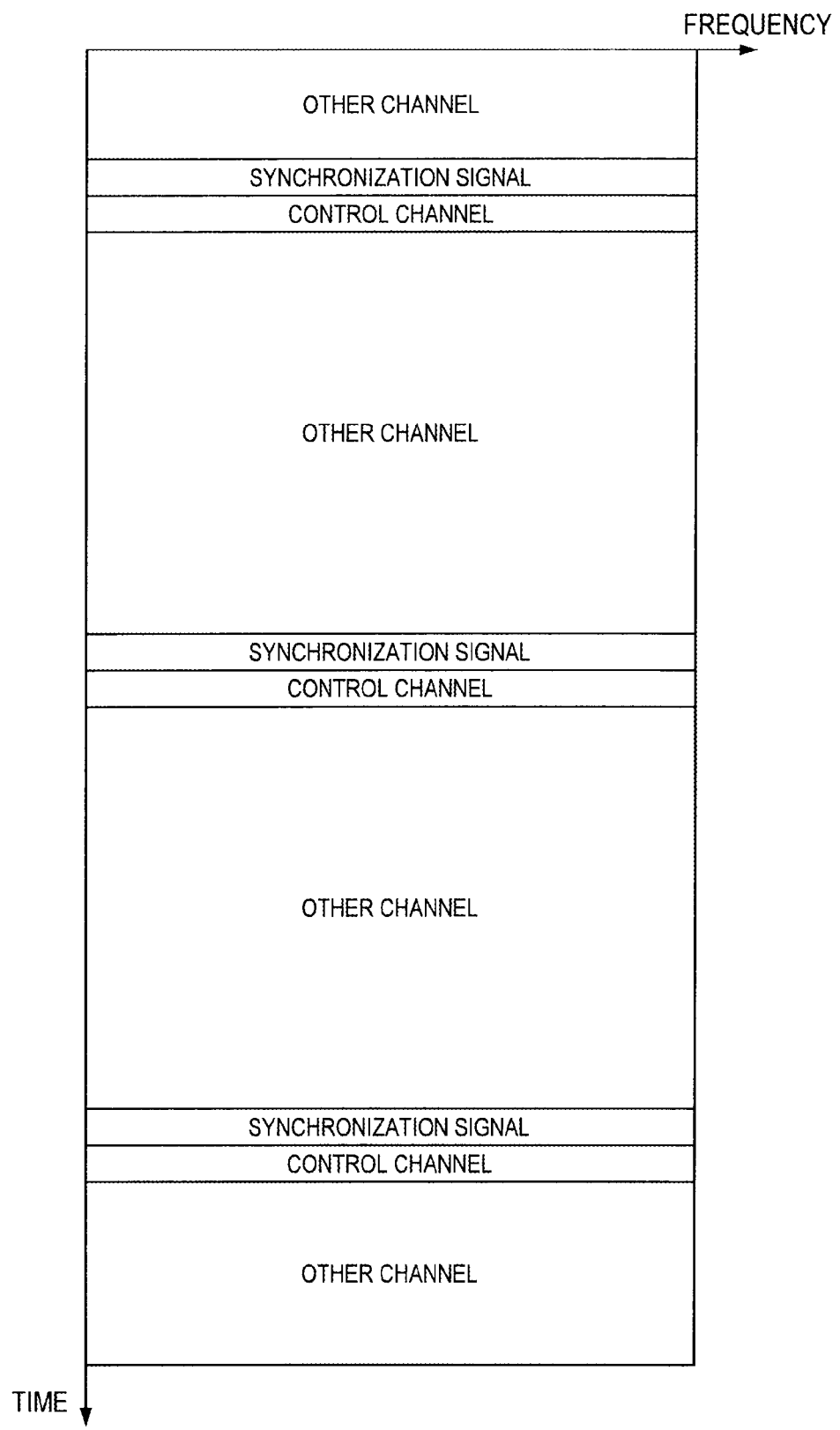
FIG. 13 is a diagram showing an example of channel usage when a relay station is absent.

FIG. 13 is a diagram showing an example of channel usage when the relay station 300 is absent in the radio communication system 1. The base station 200 transmits a synchronization signal and a control channel at regular intervals, and during a time period in which those signals are not transmitted, the frequency resource is used as another channel. "Other channel" refers to the one that is used as an uplink channel, the one that is used as a traffic channel of a downlink channel, or the like. However, for convenience of the description, the case where the other channel is used as the traffic channel is taken for example, and the description will be continued below. Accordingly, during each of the time periods with the writing "other channel" in FIG. 8, a traffic channel or the like is accommodated, and data to be exchanged between the base station 200 and the mobile station 100 is actually being transmitted/received.

Figure 14:
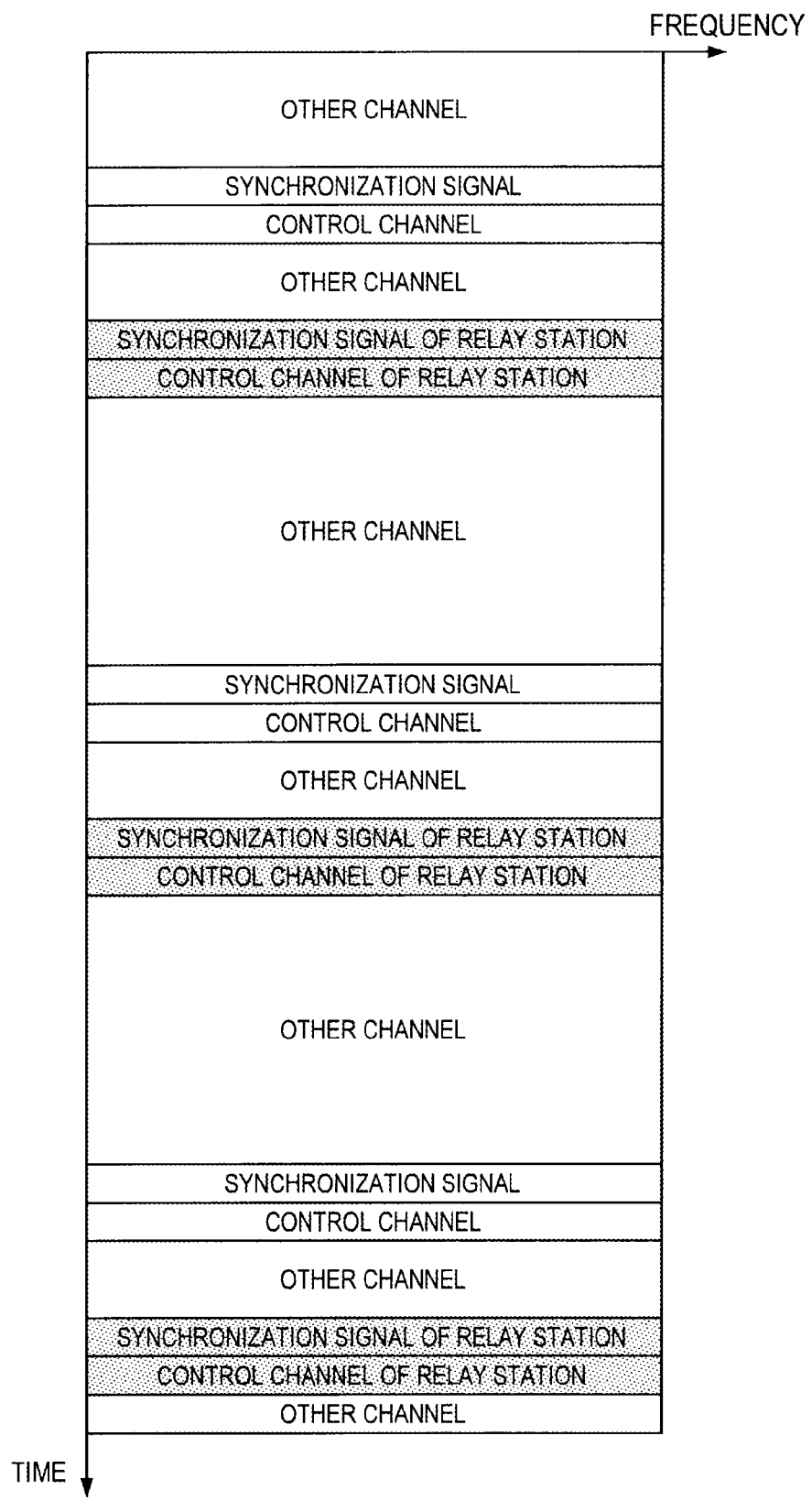
FIG. 14 is a diagram showing an example of channel usage when a relay station is present.

FIG. 14 is a diagram showing an example of channel usage when the relay station 300 is present in the radio communication system 1. In the case shown in FIG. 14, the relay station 300 behaves as if itself is the base station 200 with respect to the mobile station 100, and transmits a signal equivalent to a synchronization signal or a control signal transmitted by the base station 200 (e.g., "synchronization signal of relay station" and "control channel of relay station"). By receiving the signal, the mobile station 100 recognizes the presence of the relay station 300 and, as necessary, recognizes the relay station 300 as the base station 200, to thereby provide a communication path. At the time as shown in FIG. 14, the frequency resources which can be used by the relay station 300 are only a synchronization signal and a control signal, and hence, the relay station 300 is in a state where it is unable to transmit/receive traffic. During a time period in which the relay station 300 does not have to propagate traffic, the state as shown in FIG. 14 corresponds to a stationary state.

Figure 15:
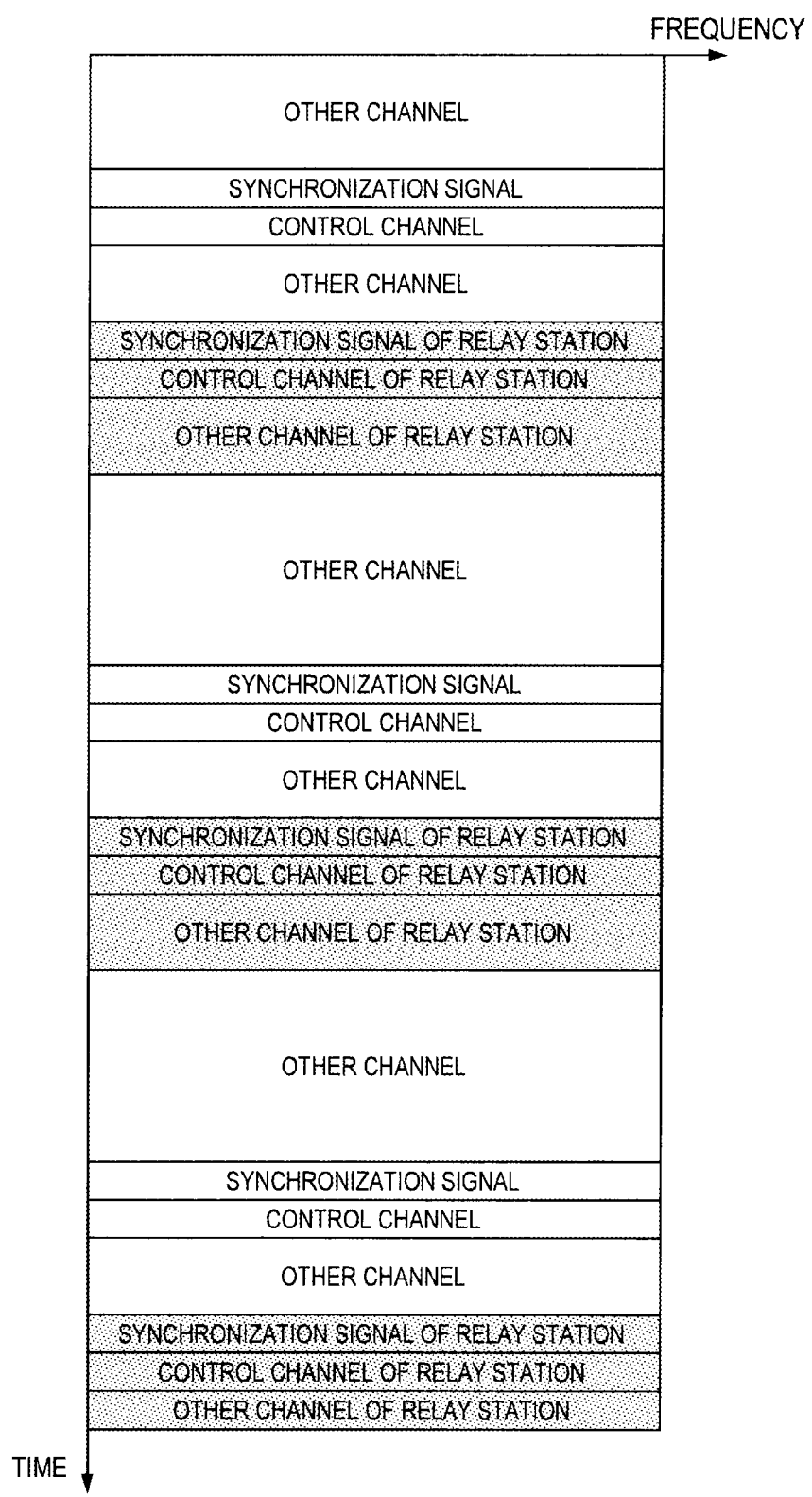
FIG. 15 is a diagram showing a state in which another channel of a relay station is allocated.

FIG. 15 shows a state where "other channel of relay station", in which the relay station 300 propagates traffic, is allocated in addition to the state shown in FIG. 14. During the time period of the "other channel of relay station", the relay station 300 performs data (traffic) communication by accommodating a channel to be used for communication with the mobile station 100 or a channel to be used for communication with the base station 200. This "other channel of relay station" is controlled to increase the time rate of the usage thereof with the increase in data amount to be handled in the relay station 300. In the case where the relay station 300 does not establish a logical link, as shown in FIG. 14, it is possible to allocate only a control signal as a utilization resource of the relay station 300, and it is also possible to allocate minimum "other channel of relay station". By allocating "other channel of relay station", the effort of channel establishment can be saved.

Figure 16:
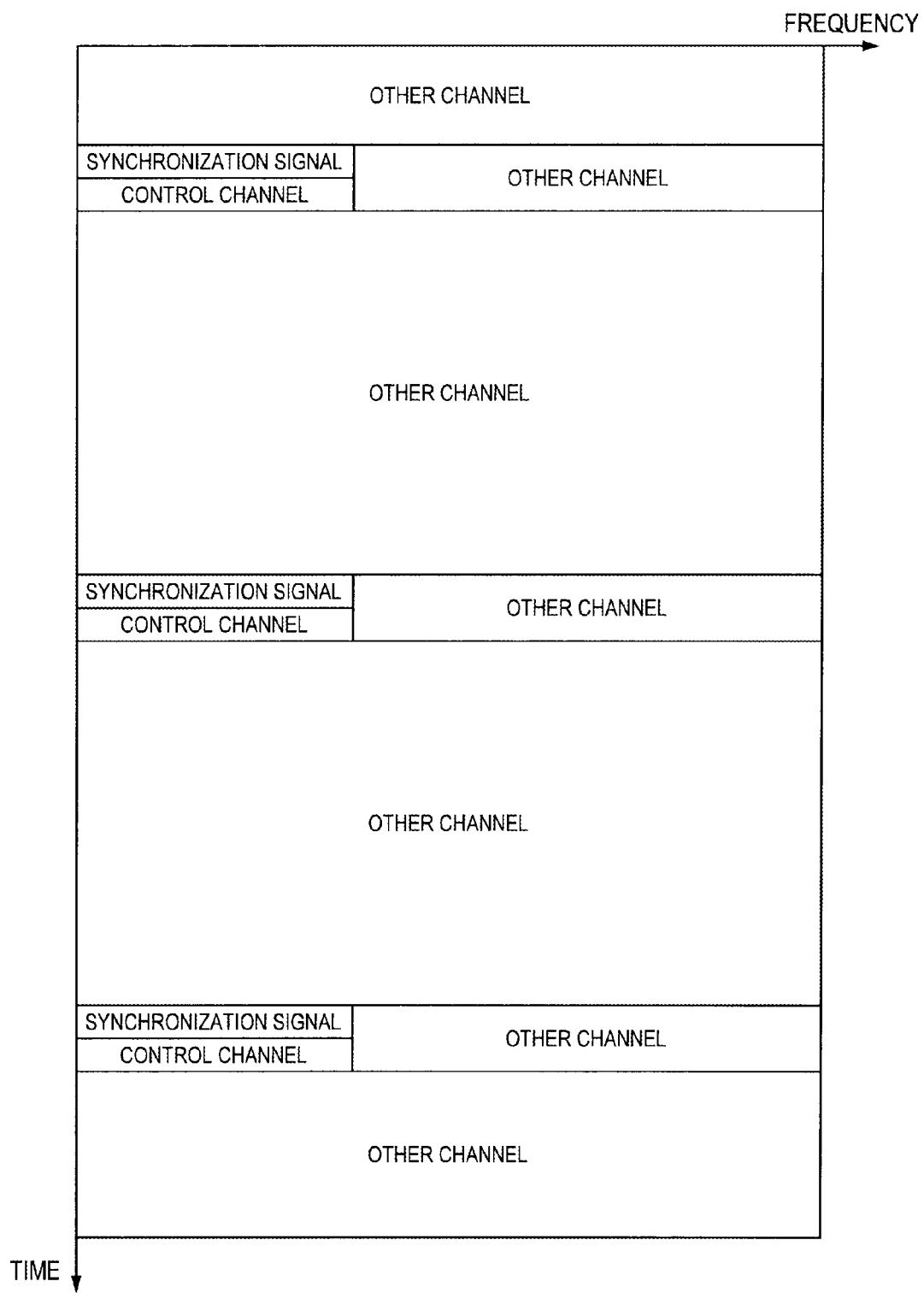
FIG. 16 is a diagram showing an example of channel usage when a relay station is absent.

Next, description will be given on the case where frequency resources under the base station 200 are allocated by frequency division. FIG. 16 is a diagram showing an example of channel usage when the relay station 300 is absent in the radio communication system 1. The base station 200 transmits a synchronization signal and a control channel at regular intervals, and the frequency bandwidth that can be used by the base station 200 is wider than the signal bandwidths of those signals, and hence, in a frequency band/time period where those signals are not transmitted, the frequency resource is used as the other channel. In each of the time periods with the writing "other channel" in FIG. 16, a traffic channel or the like is accommodated, and data to be exchanged between the base station 200 and the mobile station 100 is actually being transmitted/received.

Figure 17:
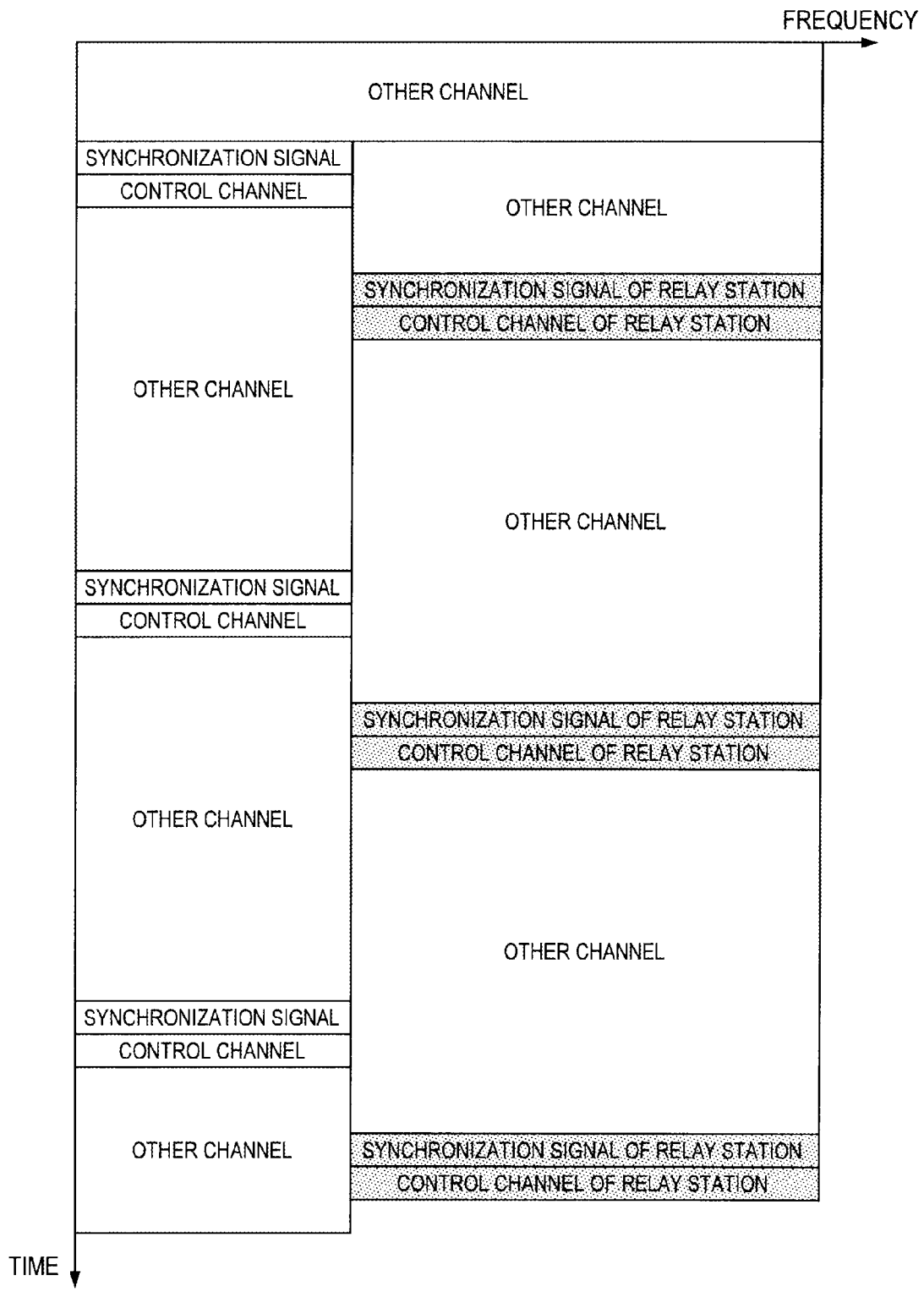
FIG. 17 is a diagram showing an example of channel usage when a relay station is present.

FIG. 17 is a diagram showing an example of channel usage when the relay station 300 is present in the radio communication system 1. In the case shown in FIG. 17, the relay station 300 behaves as if itself is the base station 200 with respect to the mobile station 100, and transmits a signal equivalent to a synchronization signal or a control signal transmitted by the base station 200 (e.g., "synchronization signal of relay station" and "control channel of relay station") by using a frequency band different from the frequency band used for the synchronization signal or the control signal transmitted by the base station 200. By receiving the signal, the mobile station 100 recognizes the presence of the relay station 300 and, as necessary, recognizes the relay station 300 as the base station 200, to thereby provide a communication path. During a time period in which the relay station 300 does not have to propagate traffic, the state as shown in FIG. 17 corresponds to a stationary state.

Figure 18:
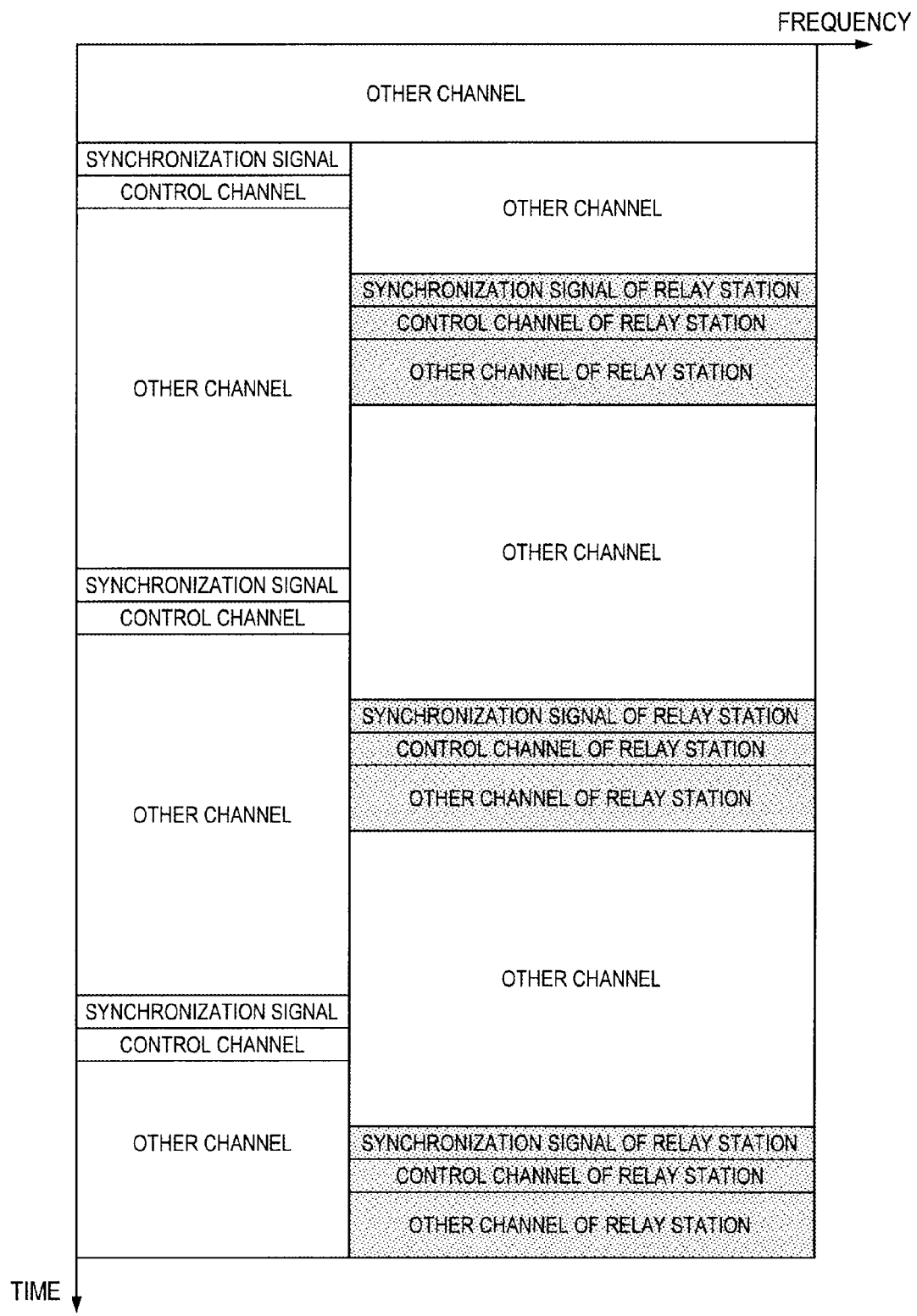
FIG. 18 is a diagram showing a state in which another channel of a relay station is allocated.

FIG. 18 shows a state where "other channel of relay station", in which the relay station 300 propagates traffic, is allocated in addition to the state shown in FIG. 17. This "other channel of relay station" is controlled to increase the time rate of the usage thereof with the increase in data amount to be handled in the relay station 300. In the case where the relay station 300 does not establish a logical link, as shown in FIG. 14, it is possible to allocate only a control signal as a utilization resource of the relay station 300, and it is also possible to allocate minimum "other channel of relay station". By allocating "other channel of relay station", the effort of channel establishment can be saved.

In this way, the base station 200 and the relay station 300 served under the base station 200 share the frequency resource to be used by time-division or frequency-division, and hence, the base station 200 can accommodate the relay station 300. Note that, although there is exemplified in the above the case where the synchronization signal and the control channel are allocated continuously in terms of time, there is also a case where they are not placed continuously. Further, although there is exemplified the case where the other channel to be used by the relay station 300 is allocated as one block, there is also a case where the other channel to be used by the relay station 300 is dispersedly allocated over multiple places (time periods).

[1-8 Channel Usage by Relay Station]

Discussion is given on items included in "other channel of relay station" described above. In "other channel of relay station", there are at least following four channels:

(1) a channel for accommodating the first logical link;

(2) a channel for accommodating communication between the base station 200 and the relay station 300 in the second logical link;

(3) a channel for accommodating communication between the relay station 300 and the mobile station 100 in the second logical link; and (4) a channel for accommodating the third logical link Therefore, in "other channel of relay station" shown in FIG. 15 and FIG. 18, the channels (1) to (4) are included depending on cases. As already described above, the allocation of "other channel of relay station" is performed by the base station 200 approving a request from the relay station 300. At the time of issuing a frequency resource allocation request to the base station 200, the relay station 300 notifies the base station 200 of which of the above types of usages the request is performed for, and the base station 200 controls the limitation of frequency resources to be allocated depending on the classification.

Typically, the first logical link and the second logical link are each established as a DTCH. On the other hand, the third logical link may be established as a DTCH, and may also be established as a CTCH to thereby perform information distribution from the relay station 300 to an unspecified number of mobile stations 100 located in periphery of the relay station 300 by broadcast communication.

[1-9. Example of Hardware Configuration of Mobile Station]

Figure 7:
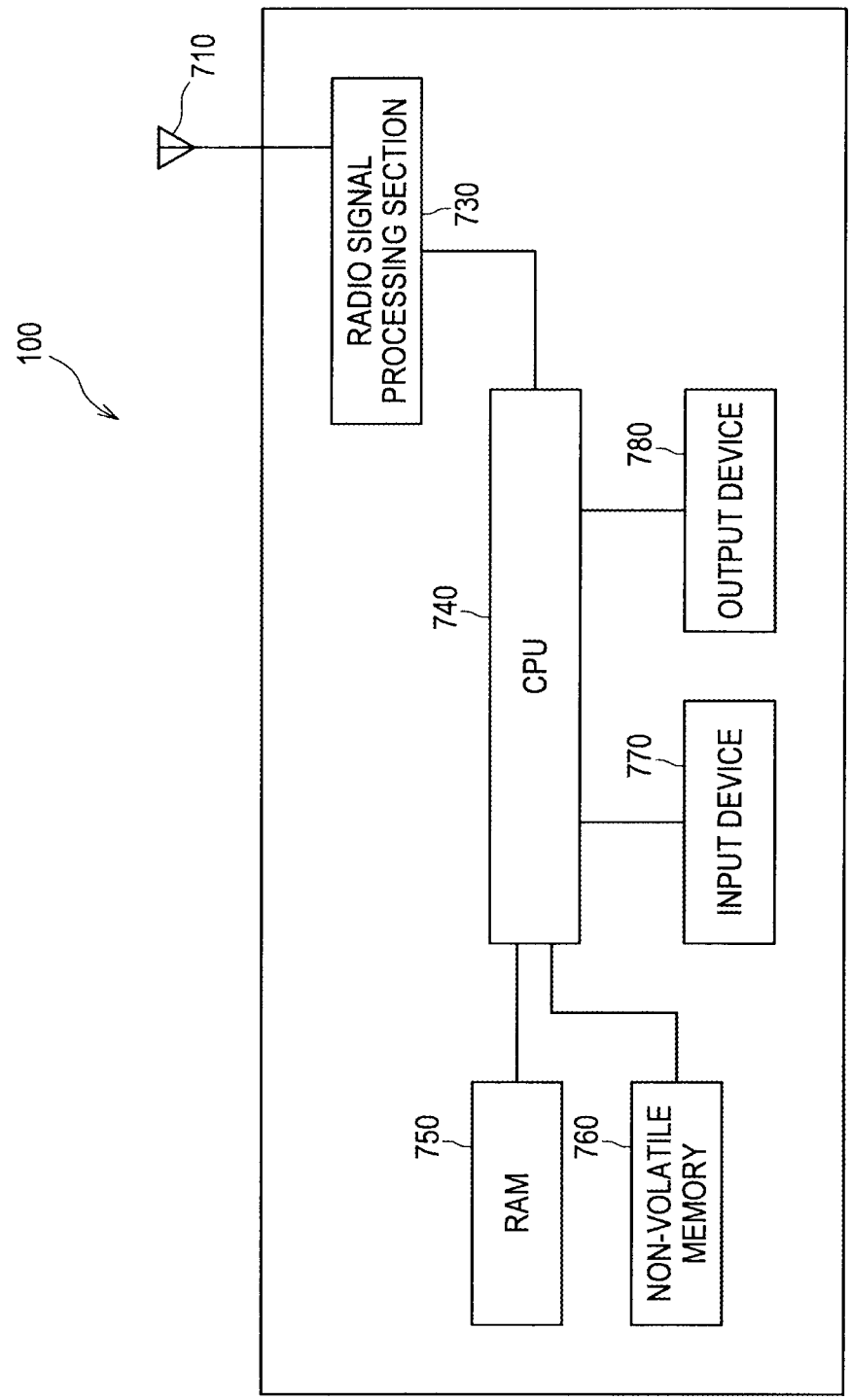
FIG. 7 is a diagram showing a hardware configuration of a mobile station according to the embodiment.

FIG. 7 is a diagram showing a hardware configuration of a mobile station according to the present embodiment. With reference to FIG. 7, the hardware configuration of the mobile station according to the present embodiment will be described. Typically, there is assumed a form like a cellular phone terminal for the mobile station 100, but the mobile station 100 is not limited to the cellular phone terminal. The mobile station 100 includes a radio signal processing section 730. The radio signal processing section 730 is a module for performing signal processing for communicating with the base station 200 and signal processing for communicating with the relay station 300. The signal processed by the module is transmitted to/received from the base station 200 and the relay station 300, which are each a communication partner, via an antenna 710.

The mobile station 100 includes a non-volatile memory 760. The mobile station 100 can store data or the like received via a third logical channel (third logical link) into the non-volatile memory 760, and can retrieve the data as necessary from the non-volatile memory 760 afterwards. The retrieved data may be output from an output device 780 after being processed by a CPU 740 to be described later.

The mobile station 100 further includes the CPU 740. A signal transmitted/received via the radio signal processing section 730 and a signal retrieved from the non-volatile memory 760 are subjected to digital signal processing in the CPU 740, and for example, the signals are each treated as a signal processed into various forms such as image information. The signal is output from the output device 780 (such as a display and a speaker). Further, the CPU 740 may accept an input of an instruction from a user via an input device 770

(such as an input button, a numeric keypad, and a touch panel), and in accordance with the instruction, the CPU 740 can develop a program stored in the non-volatile memory 760 in a RAM (Random Access Memory) 750 and execute the program.

[1-10. Example of Functional Configuration of Mobile Station]

Figure 8:
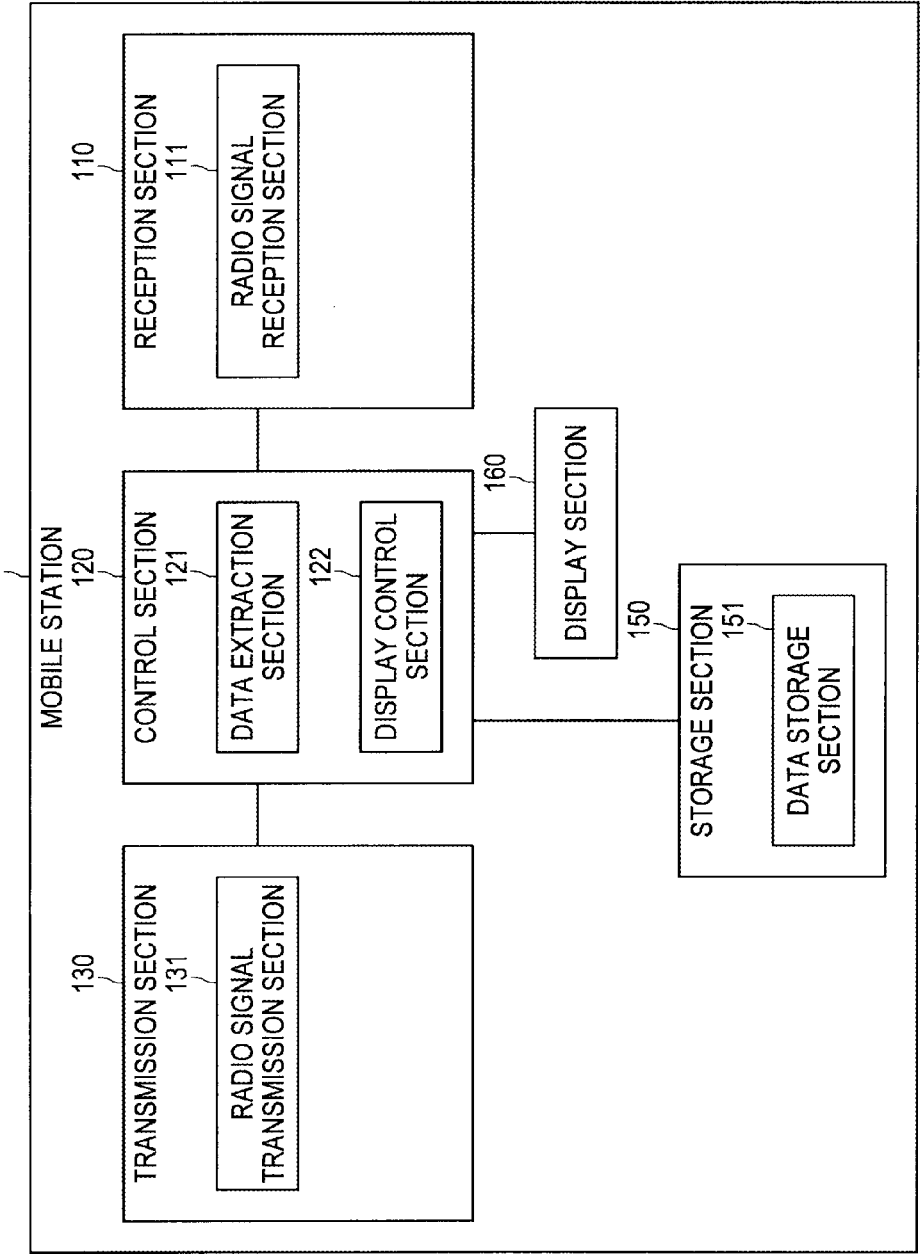
FIG. 8 is a diagram showing a functional configuration of the mobile station according to the embodiment.

FIG. 8 is a diagram showing a functional configuration of the mobile station according to the present embodiment. With reference to FIG. 8, the functional configuration of the mobile station according to the present embodiment will be described. As shown in FIG. 8, the mobile station 100 includes a reception section 110, a control section 120, a transmission section 130, a storage section 150, a display section 160, and the like.

The reception section 110 includes a radio signal reception section 111 and the like. The reception section 110 has an antenna, for example, and the antenna included in the reception section 110 may be identical to or different from an antenna included in the transmission section 130.

The control section 120 includes a data extraction section 121, a display control section 122, and the like. Further, the control section 120 has a function of controlling operation of each functional block that the mobile station 100 has. The control section 120 includes a CPU, for example, and the function thereof can be realized by developing a program stored in a non-volatile memory in a RAM by the CPU and executing the program developed in the RAM by the CPU.

The transmission section 130 includes a radio signal transmission section 131 and the like. The transmission section 130 has an antenna, for example, and the antenna included in the transmission section 130 may be identical to or different from the antenna included in the reception section 110.

The storage section 150 includes a data storage section 151 and the like. The storage section 150 has a non-volatile memory, for example.

The display section 160 functions as an example of an output device, and has a function of displaying a display content such as an image or video based on distribution data. The display section 160 has a display device, for example.

There is assumed a case where the mobile station 100 receives a radio signal from the relay station 300 via the third logical link. In this case, the radio signal reception section 111 receives the radio signal from the relay station 300. The control section 120 determines a resource used by the radio signal received by the radio signal reception section 111. The control section 120 determines that the resource used by the radio signal received by the radio signal reception section 111 is a resource indicated by mobile station-relay station resource information. In that case, because the radio signal received by the radio signal reception section 111 is addressed to the mobile station 100, the data extraction section 121 extracts data from the radio signal, and the data storage section 151 stores the data extracted by the data extraction section 121.

As described above, in the case where the mobile station 100 receives the radio signal from the relay station 300 via the third logical link, because the radio signal received by the radio signal reception section 111 is addressed to the mobile station 100, the data extraction section 121 extracts data from the radio signal, and the data storage section 151 stores the data extracted by the data extraction section 121. The display control section 122 extracts data from the data storage section 151, and displays the extracted data on the display section 160. The data displayed on the display section 160 may assumed to be distribution data, for example, and is not particularly limited.

[1-11. Example of Hardware Configuration of Base Station]

Figure 9:
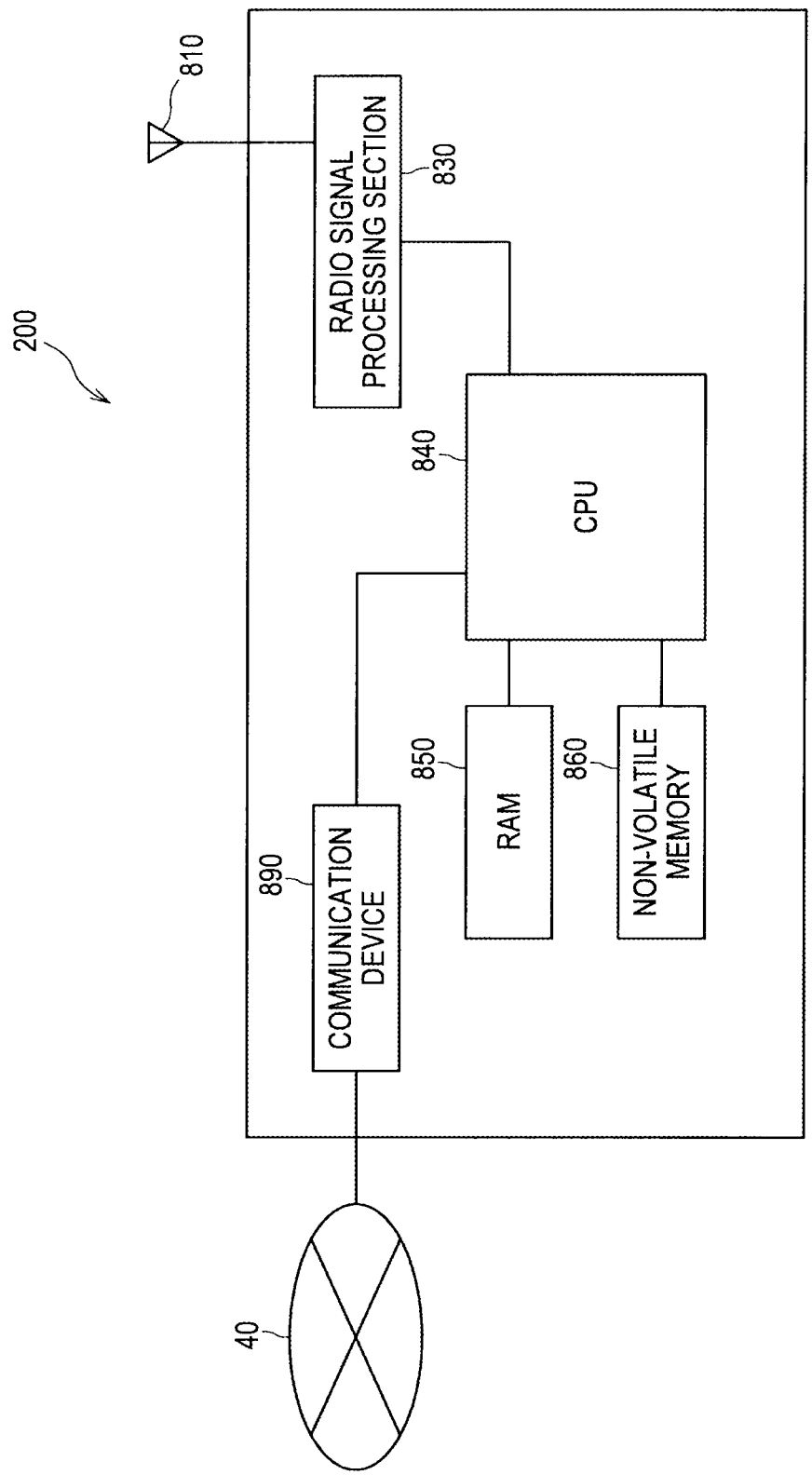
FIG. 9 is a diagram showing a hardware configuration of the base station according to the embodiment.

FIG. 9 is a diagram showing a hardware configuration of a base station according to the present embodiment. With reference to FIG. 9, the hardware configuration of the base station according to the present embodiment will be described. The base station 200 includes a radio signal processing section 830. The radio signal processing section 830 is a module for performing signal processing for communicating with the relay station 300 and signal processing for communicating with the mobile station 100. The signal processed by the module is transmitted to/received from the relay station 300 and the mobile station 100, which are each a communication partner, via an antenna 810.

The base station 200 includes a RAM (Random Access Memory) 850, a non-volatile memory 860, and the like. The base station 200 further includes a CPU 840, and the CPU 840 can develop a program stored in the non-volatile memory 860 in a RAM 850 and execute the program.

The base station 200 further includes a communication device 890. The communication device 890 is connected to a network 40, and the communication device 890 is capable of transmitting inventory data to an inventory management center or the like via the network 40. Further, the communication device 890 is capable of receiving data to be transmitted to the relay station 300 from another device via the network 40. In addition, the communication device 890 can communicate with another device which is connected to the network 40 via the network 40.

[1-12. Example of Functional Configuration of Base Station]

Figure 10:
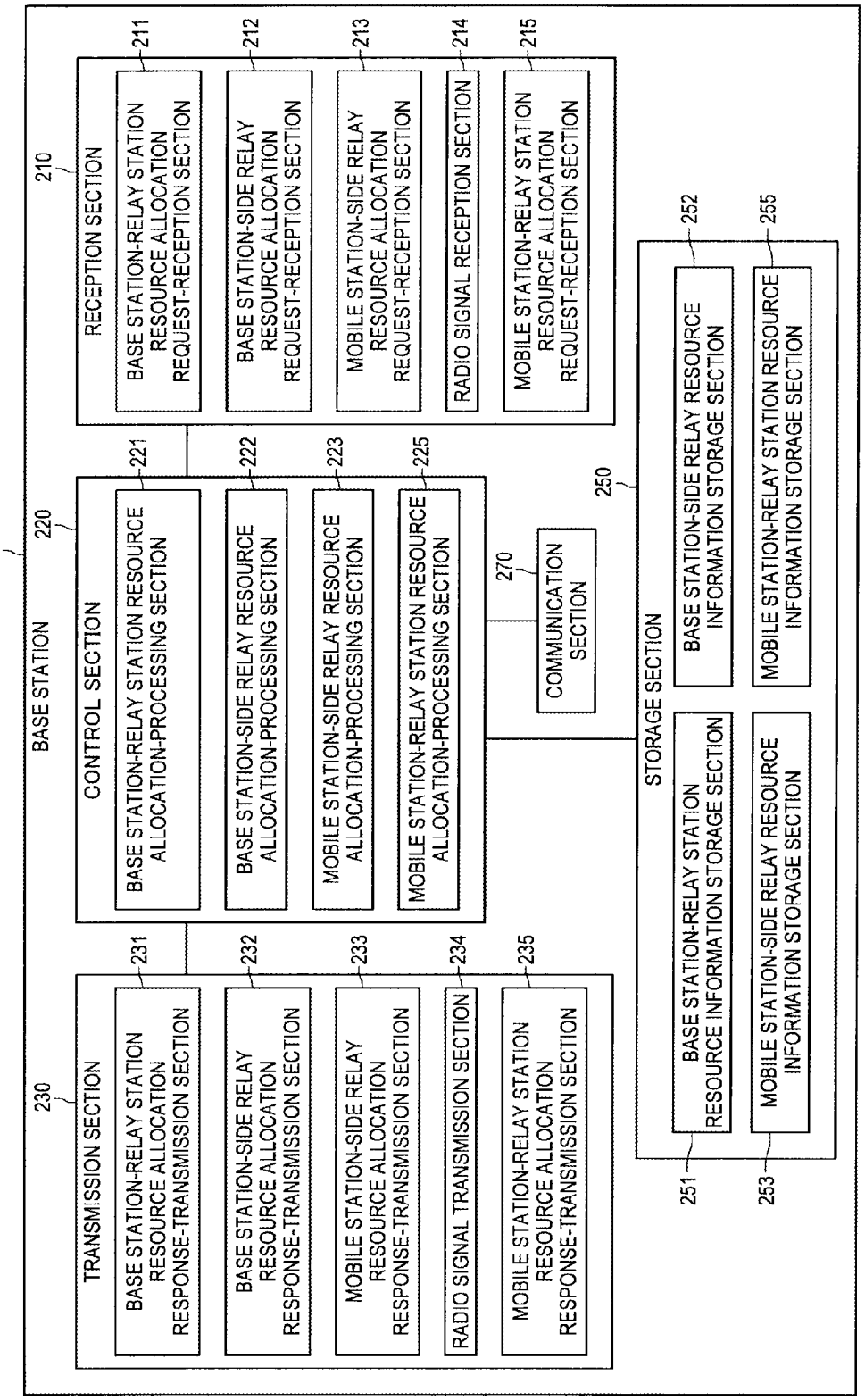
FIG. 10 is a diagram showing a functional configuration of the base station according to the embodiment.

FIG. 10 is a diagram showing a functional configuration of the base station according to the present embodiment. With reference to FIG. 10, the functional configuration of the base station according to the present embodiment will be described. As shown in FIG. 10, the base station 200 includes a reception section 210, a control section 220, a transmission section 230, a storage section 250, a communication section 270, and the like.

The reception section 210 includes a base station-relay station resource allocation request-reception section 211, a base station-side relay resource allocation request-reception section 212, a mobile station-side relay resource allocation request-reception section 213, a radio signal reception section 214, a mobile station-relay station resource allocation request-reception section 215, and the like. The reception section 210 has an antenna, for example, and the antenna included in the reception section 210 may be identical to or different from an antenna included in the transmission section 230.

The control section 220 includes a base station-relay station resource allocation-processing section 221, a base station-side relay resource allocation-processing section 222, a mobile station-side relay resource allocation-processing section 223, a mobile station-relay station resource allocation-processing section 225, and the like. Further, the control section 220 has a function of controlling operation of each functional block that the base station 200 has. The control section 220 includes a CPU, for example, and the function thereof can be realized by developing a program stored in a non-volatile memory in a RAM by the CPU and executing the program developed in the RAM by the CPU.

The transmission section 230 includes a base station-relay station resource allocation response-transmission section 231, a base station-side relay resource allocation response-transmission section 232, a mobile station-side relay resource allocation response-transmission section 233, a radio signal transmission section 234, a mobile station-relay station resource allocation response-transmission section 235, and the like. The transmission section 230 has an antenna, for example, and the antenna included in the transmission section 230 may be identical to or different from the antenna included in the reception section 210.

The storage section 250 includes a base station-relay station resource information storage section 251, a base station-side relay resource information storage section 252, a mobile station-side relay resource information storage section 253, a mobile station-relay station resource information storage section 255, and the like. The storage section 250 has a nonvolatile memory, for example.

The communication section 270 has a function of communicating with another device which is connected to the network 40 via the network 40. The communication section 270 has a communication device, for example.

In order to establish a first logical link, the base station 200 is requested by the relay station 300 to allocate a base station-relay station resource which is used by a radio signal transmitted/received between the relay station 300 and the base station 200. Therefore, the base station-relay station resource allocation request-reception section 211 receives a base station-relay station resource allocation request, which indicates that the allocation of the base station-relay station resource is requested, from the relay station 300 using a radio signal. The base station-relay station resource allocation-processing section 221 performs processing of allocating the base station-relay station resource. The base station-relay station resource allocation response-transmission section 231 transmits base station-relay station resource information indicating the base station-relay station resource to the relay station 300 by using a radio signal, as a base station-relay station resource allocation response which is a response with respect to the base station-relay station resource allocation request. The base station-relay station resource information storage section 251 stores the base station-relay station resource information which is allocated by the base station-relay station resource allocation-processing section 221. Note that, in the present embodiment, although the frequency (frequency resource) used by the radio signal and the time at which the radio signal is transmitted/received are to be used as examples of resources, the resources to be used are not particularly limited.

By using the base station-relay station resource information stored in the base station-relay station resource information storage section 251, the base station 200 can communicate with the relay station 300 via the first logical link Further, in order to establish a base station-side second logical link, the base station 200 is requested by the relay station 300 to allocate a base station-side relay resource which is used by a radio signal transmitted/received between the base station 200 and the relay station 300 among radio signals transmitted/received between the base station 200 and the mobile station 100 via the relay station 300. Therefore, the base station-side relay resource allocation request-reception section 212 receives a base station-side relay resource allocation request, which indicates that the allocation of the base station-side relay resource is requested, from the relay station 300 using a radio signal. The base station-side relay resource allocation-processing section 222 performs processing of allocating the base station-side relay resource. The base station-side relay resource allocation response-transmission section 232 transmits base station-side relay resource information indicating the base station-side relay resource to the relay station 300 by using a radio signal, as a base station-side relay resource allocation response which is a response with respect to the base station-side relay resource allocation request. The base station-side relay resource information storage section 252 stores the base station-side relay resource information which is allocated by the base station-side relay resource allocation-processing section 222.

By using the base station-side relay resource information stored in the base station-side relay resource information storage section 252, the base station 200 can communicate with the relay station 300 via the second logical link.

Further, in order to establish a mobile station-side second logical link, the base station 200 is requested by the relay station 300 to allocate a mobile station-side relay resource which is used by a radio signal transmitted/received between the mobile station 100 and the relay station 300 among radio signals transmitted/received between the base station 200 and the mobile station 100 via the relay station 300. The mobile station-side relay resource allocation request-reception section 213 receives a mobile station-side relay resource allocation request, which indicates that the allocation of the mobile station-side relay resource is requested, from the relay station 300 using a radio signal. The mobile station-side relay resource allocation-processing section 223 performs processing of allocating the mobile station-side relay resource. The mobile station-side relay resource allocation response-transmission section 233 transmits mobile station-side relay resource information indicating the mobile station-side relay resource to the relay station 300 by using a radio signal, as a mobile station-side relay resource allocation response which is a response with respect to the mobile station-side relay resource allocation request. The mobile station-side relay resource information storage section 253 stores the mobile station-side relay resource information which is allocated by the mobile station-side relay resource allocation-processing section 223.

There is assumed a case where the base station 200 receives a radio signal from the relay station 300 via the first logical link. In this case, the radio signal reception section 214 receives the radio signal from the relay station 300. The control section 220 determines a resource used by the radio signal received by the radio signal reception section 214. The control section 220 determines that the resource used by the radio signal received by the radio signal reception section 214 is a resource indicated by the base station-relay station resource information stored in the base station-relay station resource information storage section 251. In that case, the control section 220 extracts data from the radio signal received by the radio signal reception section 214, and performs processing depending on the type of the data. For example, in the case where inventory data is extracted from the radio signal received by the radio signal reception section 214, the inventory data is transmitted to an inventory management center via the communication section 270.

There is assumed a case where the base station 200 receives a radio signal from the relay station 300 via the base station-side second logical link. In this case, the radio signal reception section 214 receives the radio signal from the relay station 300. The control section 220 determines a resource used by the radio signal received by the radio signal reception section 214. The control section 220 determines that the resource used by the radio signal received by the radio signal reception section 214 is a resource indicated by the base station-side relay resource information stored in the base station-side relay resource information storage section 252. The control section 220 extracts data from the radio signal received by the radio signal reception section 214, and performs processing depending on the type of the data. That is, when receiving the radio signal by the radio signal reception section 214 via the mobile station-side second logical link, the control section 220 executes processing depending on the received radio signal.

The radio signal transmission section 234 can transmit data to the relay station 300 via the first logical link by using a radio signal. As the data to be transmitted to the relay station 300, there are given display data and distribution data. There is exemplified advertisement information as the display data. Further, the base station 200 can transmit not only the display data, but also display control information for controlling displaying the display data. Those pieces of data may be received from a network via the communication section 270 or may be read from a recording medium, for example.

In order to establish a third logical link, the base station 200 is requested by the relay station 300 to allocate a mobile station-relay station resource which is used by a radio signal transmitted/received between the mobile station 100 and the relay station 300. The mobile station-relay station resource allocation request-reception section 215 receives a mobile station-relay station resource allocation request, which indicates that the allocation of the mobile station-relay station resource is requested, from the relay station 300 using a radio signal. The mobile station-relay station resource allocation-processing section 225 performs processing of allocating the mobile station-relay station resource. The mobile station-relay station resource allocation response-transmission section 235 transmits mobile station-relay station resource information indicating the mobile station-relay station resource to the relay station 300 by using a radio signal, as a mobile station-relay station resource allocation response which is a response with respect to the mobile station-relay station resource allocation request. The mobile station-relay station resource information storage section 255 stores the mobile station-side relay resource information which is allocated by the mobile station-relay station resource allocation-processing section 225.

[1-13. Example of Hardware Configuration of Relay Station]

Figure 5:
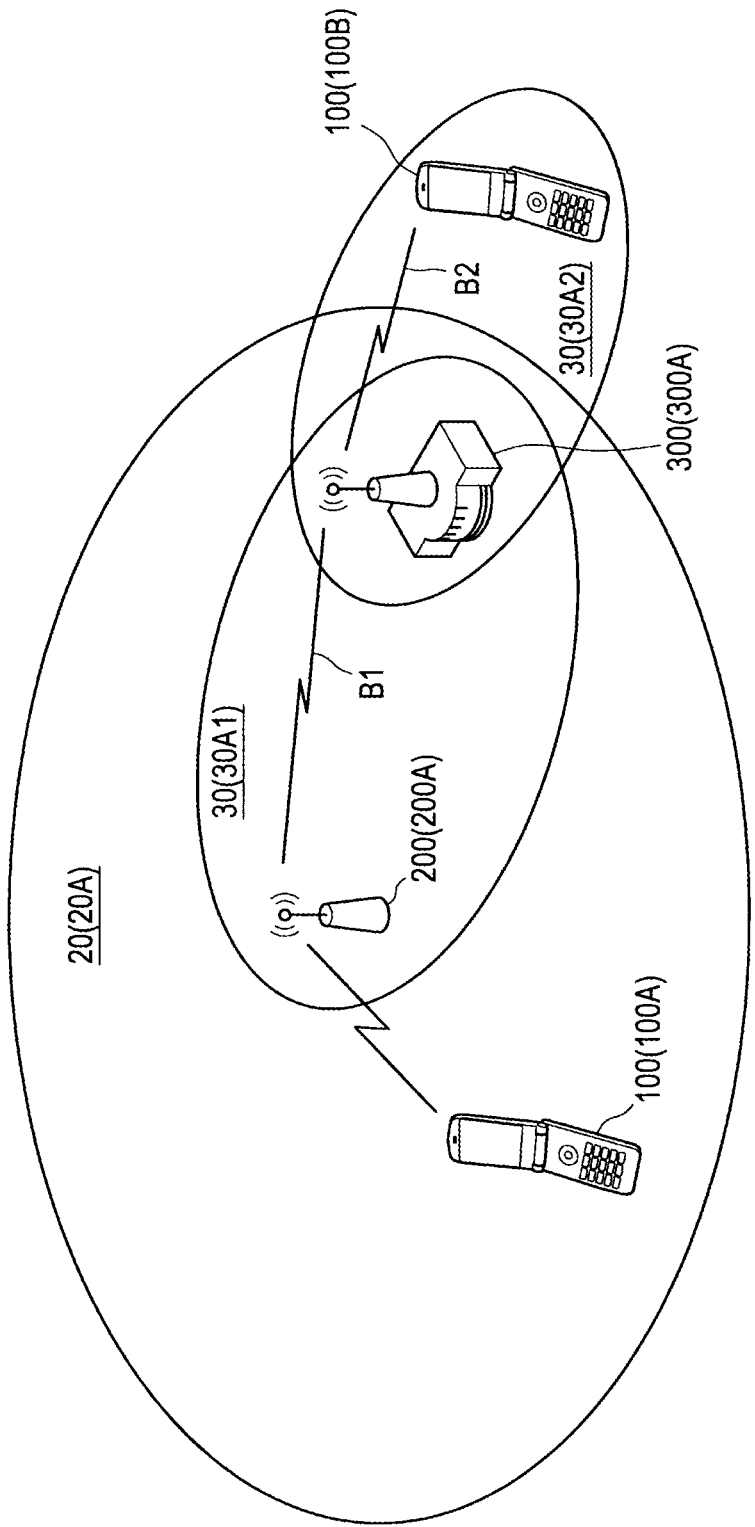
FIG. 5 is a diagram showing an example of the relay station according to the embodiment with an antenna having different directivities.
Figure 11:
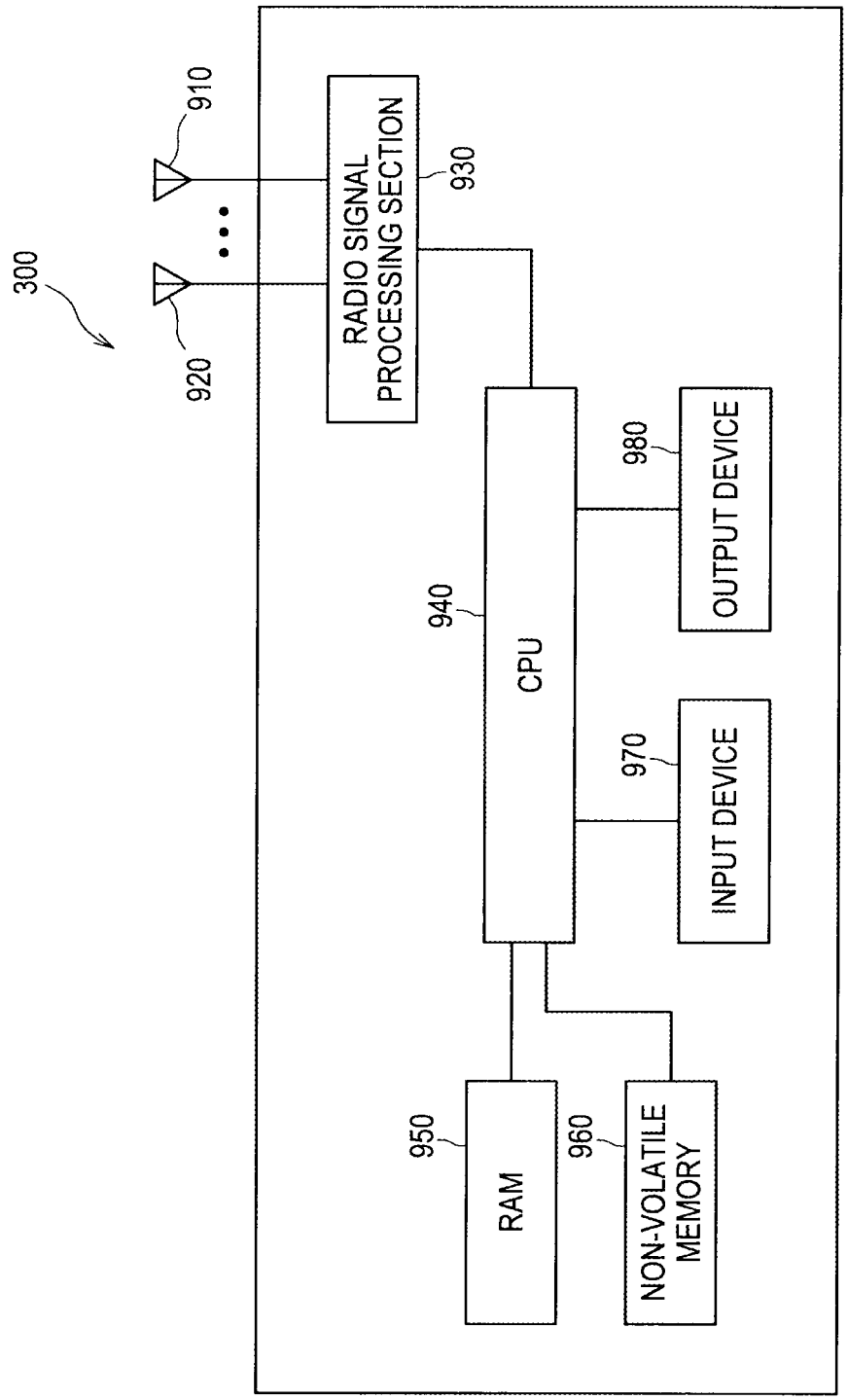
FIG. 11 is a diagram showing a hardware configuration of the relay station according to the embodiment.

FIG. 11 is a diagram showing a hardware configuration of a relay station according to the present embodiment. With reference to FIG. 11, the hardware configuration of the relay station according to the present embodiment will be described. The relay station 300 includes a radio signal processing section 930. The radio signal processing section 930 is a module for performing signal processing for communicating with the base station 200 and signal processing for communicating with the mobile station 100. The signal processed by the module is transmitted to/received from the base station 200 and the mobile station 100, which are each a communication partner, via antennas (e.g., a first antenna 910 and a second antenna 920). The number of antennas is more than two (for example, two antennas including the first antenna 910 and the second antenna 920), and the antennas may have different directivities in accordance with the communication partner. FIG. 5 is a diagram showing an example of the relay station 300 with an antenna having different directivities. For example, as shown in FIG. 5, when a relay station 300A communicates with a base station 200A which is connected thereto, the relay station 300A performs transmission/reception using a pattern whose directivity is set to the base station 200A which is to be a communication partner, as represented by a beam pattern B1, and when the relay station 300A communicates with a mobile station 100, the relay station 300A performs transmission/reception using a pattern whose directivity is set to an area which the relay station 300A provides, as represented by a beam pattern B2. An area within which the signal transmitted by the beam pattern B1 can be received is represented by a service area 30A1, and an area within which the signal transmitted by the beam pattern B2 can be received is represented by a service area 300A2.

The relay station 300 includes a non-volatile memory 960. The relay station 300 can store data or the like received via a first logical channel (first logical link) into the non-volatile memory 960, and can retrieve the data as necessary from the non-volatile memory 960 afterwards. The retrieved data may be output from an output device 980 after being processed by a CPU 940 to be described later, and may be distributed to the mobile station 100 via the radio signal processing section 930.

The relay station 300 further includes the CPU 940. A signal transmitted/received via the radio signal processing section 930 and a signal retrieved from the non-volatile memory 960 are subjected to digital signal processing in the CPU 940, and for example, the signals are each treated as a signal processed into various forms such as image information. The signal is output from the output device 980 (such as a display and a speaker). Further, the CPU 940 may accept an input of an instruction from a user via an input device 970 (such as an input button, a numeric keypad, and a touch panel), and in accordance with the instruction, the CPU 940 can develop a program stored in the non-volatile memory 960 in a RAM 950 and execute the program.

[1-14. Example of Functional Configuration of Relay Station]

Figure 12:
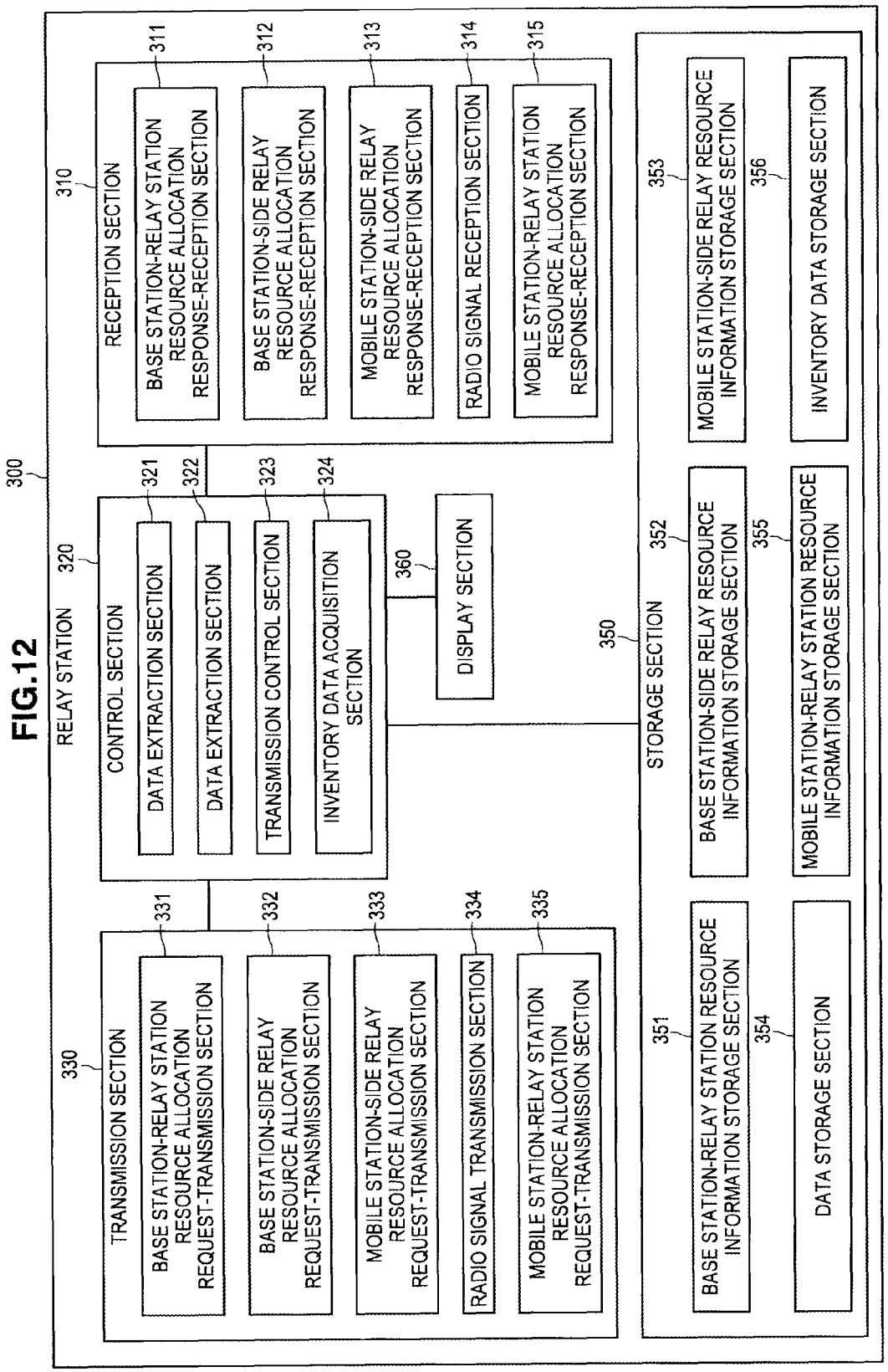
FIG. 12 is a diagram showing a functional configuration of the relay station according to the embodiment.

FIG. 12 is a diagram showing a functional configuration of the relay station according to the present embodiment. With reference to FIG. 12, the functional configuration of the relay station according to the present embodiment will be described. As shown in FIG. 12, the relay station 300 includes a reception section 310, a control section 320, a transmission section 330, a storage section 350, a display section 360, and the like.

The reception section 310 includes a base station-relay station resource allocation response-reception section 311, a base station-side relay resource allocation response-reception section 312, a mobile station-side relay resource allocation response-reception section 313, a radio signal reception section 314, a mobile station-relay station resource allocation response-reception section 315, and the like. The reception section 310 has an antenna for example, and the antenna included in the reception section 310 may be identical to or different from an antenna included in the transmission section 330.

The control section 320 includes a data extraction section 321, a display control section 322, a transmission control section 323, an inventory data acquisition section 324, and the like. Further, the control section 320 has a function of controlling operation of each functional block that the relay station 300 has. The control section 320 includes a CPU, for example, and the function thereof can be realized by developing a program stored in a non-volatile memory in a RAM by the CPU and executing the program developed in the RAM by the CPU.

The transmission section 330 includes a base station-relay station resource allocation request-transmission section 331, a base station-side relay resource allocation request-transmission section 332, a mobile station-side relay resource allocation request-transmission section 333, a radio signal transmission section 334, a mobile station-relay station resource allocation request-transmission section 335, and the like. The transmission section 330 has an antenna, for example, and the antenna includes in the transmission section 330 may be identical to or different from the antenna included in the reception section 310.

The storage section 350 includes a base station-relay station resource information storage section 351, a base station-side relay resource information storage section 352, a mobile station-side relay resource information storage section 353, a data storage section 354, a mobile station-relay station resource information storage section 355, an inventory data storage section 356, and the like. The storage section 350 has a non-volatile memory, for example.

The display section 360 functions as an example of an output device, and has a function of displaying a display content such as an image or video based on display data. The display section 360 has a display device, for example. As the display device, display devices of various kinds can be used, and for example, an electronic signboard can be used.

In order to establish a first logical link, it is necessary that the relay station 300 request the base station 200 to allocate a base station-relay station resource which is used by a radio signal transmitted/received between the base station 200 and the relay station 300. Therefore, the base station-relay station resource allocation request-transmission section 331 transmits a base station-relay station resource allocation request, which indicates that the allocation of the base station-relay station resource is requested, to the base station 200 using a radio signal. The base station-relay station resource allocation response-reception section 311 receives base station-relay station resource information indicating the base station-relay station resource from the base station 200 by using a radio signal, as a base station-relay station resource allocation response which is a response with respect to the base station-relay station resource allocation request. The base station-relay station resource information storage section 351 stores the base station-relay station resource information which is received by the base station-relay station resource allocation response-reception section 311. Note that, in the present embodiment, although the frequency (frequency resource) used by the radio signal and the time at which the radio signal is transmitted/received are to be used as examples of resources, the resources to be used are not particularly limited.

By using the base station-relay station resource information stored in the base station-relay station resource information storage section 351, the relay station 300 can communicate with the base station 200 via the first logical link.

In order to establish a base station-side second logical link, it is necessary that the relay station 300 request the base station 200 to allocate a base station-side relay resource which is used by a radio signal transmitted/received between the base station 200 and the relay station 300 among radio signals transmitted/received between the base station 200 and the mobile station 100 via the relay station 300. Therefore, the base station-side relay resource allocation request-transmission section 332 transmits a base station-side relay resource allocation request, which indicates that the allocation of the base station-side relay resource is requested, to the base station 200 using a radio signal. The base station-side relay resource allocation response-reception section 312 receives base station-side relay resource information indicating the base station-side relay resource from the base station 200 by using a radio signal, as a base station-side relay resource allocation response which is a response with respect to the base station-side relay resource allocation request. The base station-side relay resource information storage section 352 stores the base station-side relay resource information which is received by the base station-side relay resource allocation response-reception section 312.

By using the base station-side relay resource information stored in the base station-side relay resource information storage section 352, the relay station 300 can communicate with the base station 200 via the second logical link In order to establish a mobile station-side second logical link, it is necessary that the relay station 300 request the base station 200 to allocate a mobile station-side relay resource which is used by a radio signal transmitted/received between the mobile station 100 and the relay station 300 among radio signals transmitted/received between the base station 200 and the mobile station 100 via the relay station 300. Therefore, the mobile station-side relay resource allocation request-transmission section 333 transmits a mobile station-side relay resource allocation request, which indicates that the allocation of the mobile station-side relay resource is requested, to the base station 200 using a radio signal. The mobile station-side relay resource allocation response-reception section 313 receives mobile station-side relay resource information indicating the mobile station-side relay resource from the base station 200 by using a radio signal, as a mobile station-side relay resource allocation response which is a response with respect to the mobile station-side relay resource allocation request. The mobile station-side relay resource information storage section 353 stores the mobile station-side relay resource information which is received by the mobile station-side relay resource allocation response-reception section 313.

By using the mobile station-side relay resource information stored in the mobile station-side relay resource information storage section 353, the relay station 300 can communicate with the mobile station 100 via the second logical link. Further, it is necessary that the relay station 300 transmit the mobile station-side relay resource information stored in the mobile station-side relay resource information storage section 353 to the mobile station 100 via the transmission section 330 by using a radio signal, and store the mobile station-side relay resource information into the mobile station 100 as well. Thus, by using the mobile station-side relay resource information, the mobile station 100 can communicate with the relay station 300 via the second logical link There is assumed a case where the relay station 300 receives a radio signal from the base station 200 via the first logical link. In this case, the radio signal reception section 314 receives the radio signal from the base station 200. The control section 320 determines a resource used by the radio signal received by the radio signal reception section 314. The control section 320 determines that the resource used by the radio signal received by the radio signal reception section 314 is a resource indicated by the base station-relay station resource information stored in the base station-relay station resource information storage section 351. In that case, because the radio signal received by the radio signal reception section 314 is addressed to the relay station 300, the data extraction section 321 extracts data from the radio signal, and the data storage section 354 stores the data extracted by the data extraction section 321.

There is assumed a case where the relay station 300 receives a radio signal from the base station 200 via the base station-side second logical link. In this case, the radio signal reception section 314 receives the radio signal from the base station 200. The control section 320 determines a resource used by the radio signal received by the radio signal reception section 314. The control section 320 determines that the resource used by the radio signal received by the radio signal reception section 314 is a resource indicated by the base station-side relay resource information stored in the base station-side relay resource information storage section 352. By using a mobile station-side relay resource indicated by the mobile station-side relay resource information stored in the mobile station-side relay resource information storage section 353, the radio signal transmission section 334 transmits the radio signal received by the radio signal reception section 314. That is, the radio signal transmission section 334 transmits the radio signal received by the radio signal reception section 314 to the mobile station 100 via the mobile station-side second logical link There is assumed a case where the relay station 300 receives a radio signal from the mobile station 100 via the mobile station-side second logical link. In this case, the radio signal reception section 314 receives the radio signal from the mobile station 100. The control section 320 determines a resource used by the radio signal received by the radio signal reception section 314. The control section 320 determines that the resource used by the radio signal received by the radio signal reception section 314 is a resource indicated by the mobile station-side relay resource information stored in the mobile station-side relay resource information storage section 353. By using a base station-side relay resource indicated by the base station-side relay resource information stored in the base station-side relay resource information storage section 352, the radio signal transmission section 334 transmits the radio signal received by the radio signal reception section 314. That is, the radio signal transmission section 334 transmits the radio signal received by the radio signal reception section 314 to the base station 200 via the base station-side second logical link As described above, in the case where the relay station 300 receives the radio signal from the base station 200 via the first logical link, because the radio signal received by the radio signal reception section 314 is addressed to the relay station 300, the data extraction section 321 extracts data from the radio signal, and the data storage section 354 stores the data extracted by the data extraction section 321. The display control section 322 extracts data from the data storage section 354, and displays the extracted data on the display section 360. The data displayed on the display section 360 may assumed to be advertisement information, for example, and is not particularly limited.

There is a case where display control information for controlling the display is included in the radio signal transmitted from the base station 200. In this case, the data extraction section 321 further extracts the display control information from the radio signal received by the radio signal reception section 314, and the data storage section 354 further stores the display control information extracted by the data extraction section 321. The display control section 322 extracts data from the data storage section 354 and causes the display section 360 to display the extracted data, based on the display control information stored in the data storage section 354. By using the display control information in this manner, the timing at which the display data is displayed on the display section 360 can be controlled.

In order to establish a third logical link, it is necessary that the relay station 300 request the base station 200 to allocate a mobile station-relay station resource which is used by a radio signal transmitted/received between the mobile station 100 and the relay station 300. The mobile station-relay station resource allocation request-transmission section 335 transmits a mobile station-relay station resource allocation request, which indicates that the allocation of the mobile station-relay station resource is requested, to the base station 200 using a radio signal. The mobile station-relay station resource allocation response-reception section 315 receives mobile station-relay station resource information indicating the mobile station-relay station resource from the base station 200 by using a radio signal, as a mobile station-relay station resource allocation response which is a response with respect to the mobile station-relay station resource allocation request. The mobile station-relay station resource information storage section 355 stores the mobile station-relay station resource information which is received by the mobile station-relay station resource allocation response-reception section 315.

By using the mobile station-relay station resource information stored in the mobile station-relay station resource information storage section 355, the relay station 300 can communicate with the mobile station 100 via the third logical link. Further, it is necessary that the relay station 300 transmit the mobile station-relay station resource information stored in the mobile station-relay station resource information storage section 355 to the mobile station 100 via the transmission section 330 by using a radio signal, and store the mobile station-relay station resource information in the mobile station 100 as well. Thus, by using the mobile station-relay station resource information, the mobile station 100 can communicate with the relay station 300 via the third logical link There is assumed a case where the relay station 300 transmits a radio signal received from the base station 200 to the mobile station 100 via the first logical link. In this case, the radio signal transmission section 334 can transmit a radio signal which uses the mobile station-relay station resource indicated by the mobile station-relay station resource information stored in the mobile station-relay station resource information storage section 355, and the transmission control section 323 extracts data from the data storage section 354 and causes the radio signal transmission section 334 to transmit the extracted data by using the radio signal. That is, the radio signal transmission section 334 transmits the data stored in the data storage section 354 to the mobile station 100 via the third logical link by using the radio signal. It is assumed that the data extracted by the transmission control section 323 from the data storage section 354 is distribution data, and the distribution data may be identical to or different from the display data which is extracted by the data extraction section 321 and displayed on the display section 360.

It is also possible that the relay station 300 transmits data to the base station 200 via the first logical link. For example, the radio signal transmission section 334 can transmit a radio signal which uses the base station-relay station resource indicated by the base station-relay station resource information stored in the base station-relay station resource information storage section 351, and the inventory data acquisition section 324 acquires, from a vending machine connected to the relay station 300, inventory data inside the vending machine. The inventory data storage section 356 stores the inventory data acquired by the inventory data acquisition section 324. The transmission control section 323 extracts the inventory data stored in the inventory data storage section 356 and causes the radio signal transmission section 334 to transmit the extracted inventory data by using a radio signal.

The base station 200 transmits the inventory data transmitted from the relay station 300 via, for example, the network 40 to an inventory management center which manages inventory data. Accordingly, the inventory management center can check the inventory status of products inside the vending machine by communicating with the relay station 300 via the first logical link.

The communication performed by the relay station 300 is performed via the first logical link, the second logical link, or the third logical link. However, the relay station 300-based communication includes communication using the first logical link and communication using the third logical link; and communication using the second logical link, as for the relay station 300, is performed in order to relay the communication between the mobile station 100 and the relay station 300. Therefore, the charge for communication performed by the relay station 300 may be calculated by a charge calculation device by subtracting the charge for communication using the second logical link from the charge for communication using the first logical link and the charge for communication using the third logical link. In other words, the charge for the communication performed by the relay station 300 may be calculated by the charge calculation device based on information related to at least one of radio signal transmission using the base station-side relay resource, radio signal reception using the base station-side relay resource, radio signal transmission using the mobile station-side relay resource, and radio signal reception using the mobile station-side relay resource, which are performed by the relay station 300.

[1-15. Signal Processing of Relay Station]

In the case where the second logical link is established, the relay station 300 transmits (relays) the data received via the second logical link to the base station 200 or the mobile station 100. As the relay methodology, generally known methodologies can be used, and the relay methodology using the second logical link is not particularly limited.

Figure 19:
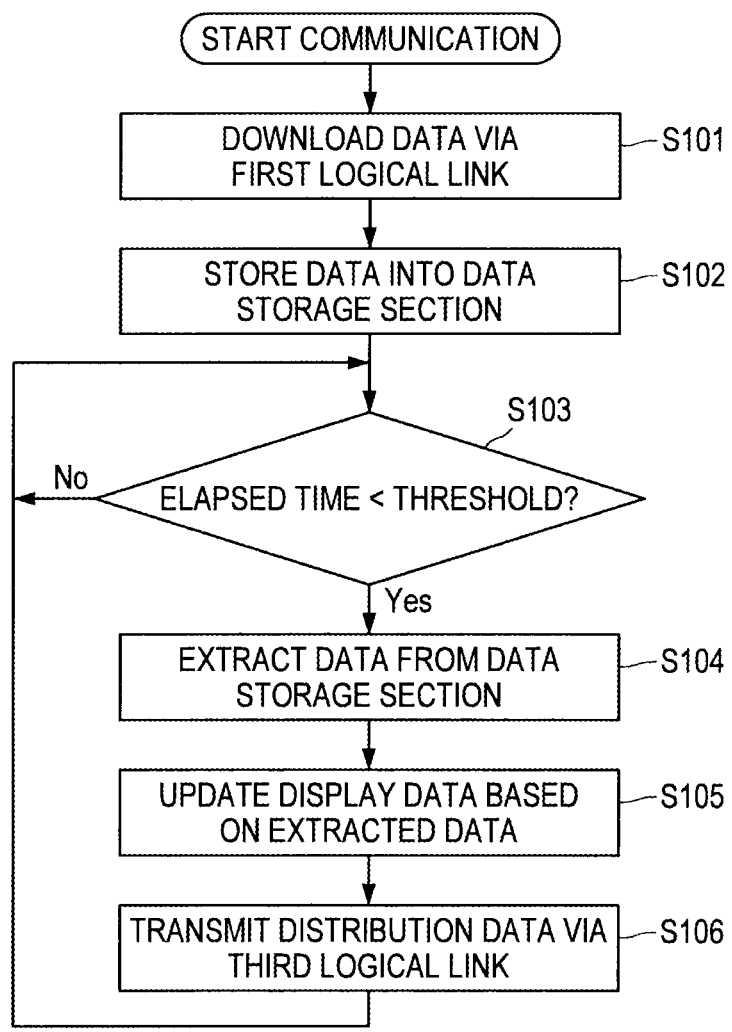
FIG. 19 is a flowchart showing a flow of processing performed by using a first logical link and a third logical link.

FIG. 19 is a flowchart showing a flow of processing performed by using a first logical link and a third logical link. Hereinafter, the utilization form of the first logical link and the third logical link will be described with reference to FIG. 19. The relay station 300 establishes the first logical link in response to paging from a network 40 side to which the base station is connected or a request generated by the relay station 300 itself. The relay station 300 downloads data to be used by the relay station 300 itself, via the first logical link (Step S101). In addition, the relay station 300 stores the received data into a data storage section (Step S102). The received data includes content to be output by a display section, content to be distributed by the relay station 300 to the mobile station 100 via the third logical link, and the like. Still further, the received data includes control information indicating how to distribute content, such as a threshold used for controlling update frequency of output data.

Simultaneously therewith, the relay station 300 drives a timer, and, for example, when the measured elapsed time exceeds a threshold ("Yes" in Step S103), the relay station 300 extracts data and the like stored in the data storage section (Step S104), and updates display data output by the display section such as a display device included in the relay station 300 itself, based on the extracted data (Step S105). In this way, the content displayed at the relay station 300 can be dynamically changed.

Further, in the case where the third logical link is established, the relay station 300 extracts distribution data to be distributed to a nearby mobile station 100 from the information stored in the data storage section, and transmits the distribution data to the mobile station 100 via the third logical link (Step S106). In order to transmit the data via the third logical link, in the case where the relay station 300 determines that the allocation of a new frequency resource is necessitated, the relay station 300 requests the base station 200 to allocate a third logical link-use frequency resource prior to data distribution via the third logical link. When the resource is allocated by the base station 200, the relay station 300 notifies the mobile station 100 of the resource information and then performs data transmission via the third logical link by using the frequency resource.

In the above description, although there is exemplified the case where the updating of output data (display data) and the distribution of data using the third logical link begin at the same time, the execution triggers of the above two may have different timing. Further, in the example shown in FIG. 19, although the updating of output data (display data) and distribution data is performed based on the elapse of time, there may be a case where the processing is activated based on an event other than the elapse of time. The event may be distributed from the base station 200 to the relay station 300 via the first logical link, as control information indicating how to distribute the content.

It is typical that the relay station 300 establishes a CTCH as the third logical link and performs information distribution to an unspecified number of mobile stations 100 located in periphery of the relay station 300 by broadcast communication via the traffic channel. However, the relay station 300 may also perform information distribution to the mobile station 100 by using the third logical link in response to a request from the mobile station 100 or the like. In this case, the relay station 300 establishes a DTCH as the third logical link to the mobile station 100 which issues the request and transfers data to the mobile station 100 via the traffic channel As described above, the data distribution performed via the third logical link is executed by extracting information stored in the non-volatile memory 960 of the relay station 300, and hence, one piece of data may be distributed multiple times. The data is distributed from the base station 200 to the relay station 300 via the first logical link beforehand, and, although the first logical link is used only once, the data can be distributed to the mobile station 100 multiple times, and hence, it becomes possible to enhance utilization efficiency of the frequency resource.

[1-16. Specific Example of Relay Station (Part 1: Case of Electronic Signboard)]

The detail of the relay station 300 will be further described with a specific example. Here, the example is given of the case where the relay station 300 is a device which operates as an electronic signboard. In this case, it is assumed that the data transferred from the base station 200 to the relay station 300 via the first logical link is advertisement information, and that the output device 980 in the relay station 300 is a display having a size of 32 inches or more. The display is used for allowing an unspecified number of people to directly browse content. The content is for most of the cases moving image information. The content of the moving image information to be reproduced is transferred from the base station 200 side via the first logical link and is stored in the non-volatile memory 960, and information to be displayed is updated in accordance with elapsed time, period of time, and another factor. Control information on how to update the display content is also transferred from the base station 200 via the first logical link and is stored in the non-volatile memory 960.

Further, in the data transferred to the relay station 300 via the first logical link, there is included data distributed from the relay station 300 to the mobile station 100 via the third logical link. The data may be identical to the content to be displayed on the display of the relay station 300, but it is typical that the data is distributed as another data which is to be distributed to the mobile station 100 device.

As described with reference to FIG. 5, when the relay station 300A communicates with a mobile station 100, the relay station 300A performs transmission/reception using a pattern whose directivity is set to an area which the relay station 300A provides, as represented by the beam pattern B2, and may also adjust the radio wave-transmission/reception antenna radiation pattern to the display direction of the display. In this way, it becomes possible to persuade a person watching the display of the relay station 300 to establish the third logical link As described above, by the relay station 300 having the function as an electronic signboard, the installment of the relay station 300 is encouraged to be performed not by a service provider but by an electronic signboard provider. Needless to say, also in this case, the relay station 300 establishes the already mentioned second logical link, and has a function of providing a communication path between the mobile station 100 and the base station 200.

[1-17. Specific Example of Relay Station 300 (Part 2: Case of Vending Machine)]

A specific configuration of the relay station 300 will be described with reference to another example. It is an example of the case where the relay station 300 is a device which manages inventory data of a vending machine. In this case, as shown in FIG. 12, the relay station 300 includes an inventory data storage section. The inventory data storage section stores commodity inventory data inside the vending machine, and, when the commodity inventory inside the vending machine lessens, the inventory data storage section notifies an inventory management center of the state via the base station 200. In this case, the commodity inventory data inside the vending machine is included in the data transferred between the base station 200 and the relay station 300 via the first logical link.

In addition, data distributed from the relay station 300 to the mobile station 100 via the third logical link is also included in data transferred from the relay station 300 via the first logical link, and the data is stored in the data storage section, and then distributed to the mobile station 100 via the third logical link as necessary.

In this way, by the relay station 300 managing the inventory data inside the vending machine, the installment of the relay station 300 is encouraged to be performed not by a service provider but by a vending machine installer. Needless to say, also in this case, the relay station 300 establishes the already mentioned second logical link, and has a function of providing a communication path between the mobile station 100 and the base station 200.

[1-18. Example of Charging System]

Figure 20:
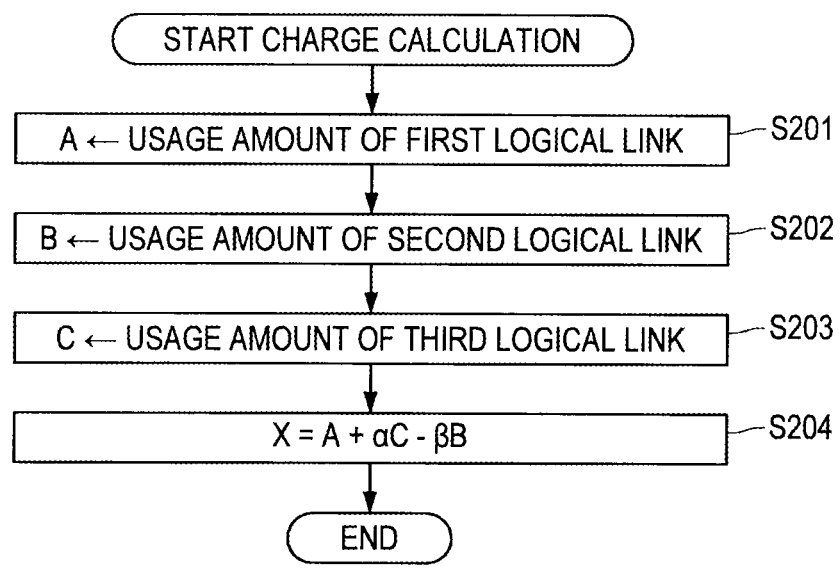
FIG. 20 is a flowchart showing a flow of processing for calculating a charge for communication performed by a relay station.

As described above, in the case where the relay station 300 is installed by a person other than the service provider of the radio communication system 1, it is necessary that the owner of the relay station 300 pay to the service provider the cost equivalent to the frequency resource occupied for using the first logical link and the third logical link. However, the relay station 300 also simultaneously assists to connect the mobile station 100 to the base station 200 by establishing the second logical link, and hence, it is considered that the service provider should pay to the owner of the relay station 300 the cost equivalent to the assistant operation. Accordingly, it is recommended that a charging system be installed by taking the above into account. FIG. 20 is a flowchart showing a flow of processing for calculating a charge for communication performed by a relay station. The example thereof will be described with reference to FIG. 20. The usage charge as described below is calculated by a charge calculation device, for example.

The charge calculation device sets a total amount of a frequency resource used for communication via the first logical link as a variable A (Step S201), sets a total amount of a frequency resource used for communication via the second logical link as a variable B (Step S201), and sets a total amount of a frequency resource used for communication via the third logical link as a variable C (Step S203). After that, the charge calculation device adds A to $\alpha$C, in which C is weighted with $\alpha$, then subtracts $\beta$B, in which B is weighted with $\beta$, from the sum, and adopts the obtained value as a charge X (Step S204).

Accordingly, charging information can be extracted by subtracting the frequency resource which the relay station 300 contributes to the service provider from the frequency resource which the relay station 300 uses in the interest of itself. The total amount of the frequency resource is calculated based on, for example, used frequency bandwidth and total time of using the frequency bandwidth and is calculated by, for example, multiplying used frequency bandwidth by total time of using the frequency bandwidth.

<2. Modified Example>

It should be understood by those skilled in the art that various modifications, combinations, sub-combinations and alterations may occur depending on design requirements and other factors insofar as they are within the scope of the appended claims or the equivalents thereof.

<3. Summary>

According to the present embodiment, there can be provided a technology for enabling the relay station to provide a communication path between the mobile station and the base station and the relay station to be an endpoint of communication. Accordingly, the relay station can operate as a user of a radio communication system while operating as a part of an infrastructure facility. Further, the radio communication system can provide a resource used by a radio signal as necessary, and hence, the resource can be used effectively.

The present application contains subject matter related to that disclosed in Japanese Priority Patent Application JP 2009-210989 filed in the Japan Patent Office on Sep. 11, 2009, the entire content of which is hereby incorporated by reference.

What is claimed is:

1. A relay station device comprising:
a base station-relay station resource allocation request-transmission section configured to transmit a base station-relay station resource allocation request to a base station device, the base station-relay station resource allocation request indicating that allocation of a base station-relay station resource is requested, the base station-relay station resource being requested for a first radio signal to be transmitted/received between the base station device and the relay station device;
a base station-relay station resource allocation response-reception section configured to receive base station-relay station resource information from the base station device, the base station-relay station resource information being a response to the base station-relay station resource allocation request and indicating the base station-relay station resource;
a base station-relay station resource information storage section configured to store the base station-relay station resource information; and
a base station-side relay resource allocation request-transmission section configured to transmit a base station-side relay resource allocation request to the base station device, the base station-side relay resource allocation request indicating that allocation of a base station-side relay resource is requested, the base station-side relay resource being requested for a second radio signal to be transmitted/received between the base station device and the relay station device among radio signals transmitted/received between the base station device and a mobile station device via the relay station device,
wherein the base station-relay station resource corresponds to a first logical link between the relay station device and the base station device, the relay station device being an endpoint of the first logical link.

2. The relay station device according to claim 1, further comprising:
a base station-side relay resource allocation response-reception section configured to receive base station-side relay resource information from the base station, the base station-side relay resource information being a response to the base station-side relay resource allocation request and indicating the base station-side relay resource; and
a base station-side relay resource information storage section configured to store the base station-side relay resource.

3. The relay station device according to claim 2, further comprising:
a mobile station-side relay resource allocation request-transmission section configured to transmit a mobile station-side relay resource allocation request to the base station device, the mobile station-side relay resource allocation request indicating that allocation of a mobile station-side relay resource is requested, the mobile station-side relay resource being requested for a third radio signal to be transmitted/received between the mobile station device and the relay station device among the radio signals transmitted/received between the base station device and the mobile station device via the relay station device;
a mobile station-side relay resource allocation response-reception section configured to receive mobile station-side relay resource information from the base station, the mobile station-side relay resource information being a response to the mobile-station side relay resource allocation request and indicating the mobile station-side relay resource; and
a mobile station-side relay resource information storage section configured to store the mobile station-side relay resource information.

4. The relay station device according to claim 3, further comprising:
a radio signal reception section configured to receive a radio signal;
a data extraction section configured to extract data from the radio signal, when the radio signal uses the base station-relay station resource; and
a data storage section configured to store the extracted data.

5. The relay station device according to claim 4, further comprising
a radio signal transmission section configured to transmit a radio signal that uses the mobile station-side relay resource, when the radio signal received by the radio signal reception section uses the base station-side relay resource.

6. The relay station device according to claim 5, wherein the radio signal transmission section is further configured to transmit a radio signal that uses the base station-side relay resource, when the radio signal received by the radio signal reception section uses the mobile station-side relay resource.

7. The relay station device according to claim 4, further comprising:
a display section; and
a display control section configured to cause the display section to display the extracted data.

8. The relay station device according to claim 7, wherein:
the data extraction section is further configured to extract display control information for controlling a display from the radio signal received by the radio signal reception section,
the data storage section is further configured to store the display control information; and
the display control section is configured to cause the display section to display the extracted data based at least in part on the display control information.

9. The relay station device according to claim 4, further comprising:
a mobile station-relay station resource allocation request-transmission section configured to transmit a mobile station-relay station resource allocation request to the base station device, the mobile station-relay station resource allocation request indicating that allocation of a mobile station-relay station resource is requested, the mobile station-relay station resource being requested for a fourth radio signal to be transmitted/received between the mobile station device and the relay station device;
a mobile station-relay station resource allocation response-reception section configured to receive mobile station-relay station resource information from the base station device, the mobile station-relay station resource information being a response to the mobile station-relay station resource allocation request and indicating the mobile station-relay station resource; and
a mobile station-relay station resource information storage section configured to store the mobile station-relay station resource information,
wherein the mobile station-relay station resource corresponds to a third logical link between the relay station device and the mobile station device, the relay station device being an endpoint of the third logical link.

10. The relay station device according to claim 9, further comprising:
a radio signal transmission section configured to transmit a radio signal which uses the mobile station-relay station resource; and
a transmission control section configured to cause the radio signal transmission section to transmit the extracted data.

11. The relay station device according to claim 1, further comprising:
a radio signal transmission section configured to transmit a radio signal which uses the base station-relay station resource;
an inventory data acquisition section configured to acquire, from a vending machine, inventory data;
an inventory data storage section configured to store the inventory data; and
a transmission control section configured to cause the radio signal transmission section to transmit the inventory data.

12. The relay station device according to claim 9, wherein a charge for communication performed by the relay station is calculated based on information related to at least one of radio signal transmission using the base station-side relay resource, radio signal reception using the base station-side relay resource, radio signal transmission using the mobile station-side relay resource, and radio signal reception using the mobile station-side relay resource.

13. A base station device comprising;
a base station-relay station resource allocation request-reception section configured to receive a base station-relay station resource allocation request from a relay station device, the base station-relay station resource allocation request indicating that allocation of a base station-relay station resource is requested, the base station-relay station resource being requested for a first radio signal to be transmitted/received between the relay station device and the base station device;

a base station-relay station resource allocation-processing section configured to perform allocation of the base station-relay station resource;

a base station-relay station resource information storage section configured to store base station-relay station resource information indicating the base station-relay station resource;

a base station-relay station resource allocation response-transmission section configured to transmit the base station-relay station resource information to the relay station device, the base station-relay station resource information being a response to the base station-relay station resource allocation request; and a base station-side relay resource allocation request-reception section configured to receive a base station-side relay resource allocation request from the relay station device, the base station-side relay resource allocation request indicating that allocation of a base station-side relay resource is requested, the base station-side relay resource being requested for a second radio signal to be transmitted/received between the base station device and the relay station device among radio signals transmitted/received between the base station device and a mobile station device via the relay station device, wherein the base station-relay station resource corresponds to a first logical link between the relay station device and the base station device, the relay station device being an endpoint of the first logical link.

14. A mobile station device configured to receive a radio signal from a relay station device, the relay station device including:

a mobile station-relay station resource allocation request-transmission section configured to transmit a mobile station-relay station resource allocation request to a base station device, the mobile station-relay station resource allocation request indicating that allocation of a mobile station-relay station resource is requested, the mobile station-relay station resource being for use by a radio signal to be transmitted/received between the mobile station device and the relay station device, a mobile station-relay station resource allocation response-reception section configured to receive mobile station-relay station resource information from the base station device, the mobile station-relay station resource information being a response to the mobile station-relay station resource allocation request and indicating the mobile station-relay station resource; and a mobile station-relay station resource information storage section configured to store the mobile station-relay station resource information, a radio signal transmission section configured to transmit a radio signal which uses the mobile station-relay station resource, and a transmission control section configured to cause the radio signal transmission section to transmit extracted data, wherein the mobile station-relay station resource corresponds to a third logical link between the relay station device and the mobile station device, the relay station device being an endpoint of the third logical link.

15. A radio communication system comprising:
a base station device; and
a relay station device,
wherein the base station device includes:
   a base station-relay station resource allocation request-reception section configured to receive a base station-relay station resource allocation request from the relay station device, the base station-relay station resource allocation request indicating that allocation of a base station-relay station resource is requested, the base station-relay station resource being for use by a radio signal transmitted/received between the relay station device and the base station device,
   a base station-relay station resource allocation-processing section configured to perform allocation of the base station-relay station resource,
   a base station-relay station resource information storage section configured to store base station-relay station resource information indicating the base station-relay station resource, and
   a base station-relay station resource allocation response-transmission section configured to transmit the base station-relay station resource information to the relay station device, the base station-relay station resource information being a response to the base station-relay station resource allocation request, and
wherein the relay station device includes:
   a base station-relay station resource allocation request-transmission section configured to transmit a base station-relay station resource allocation request to the base station device, the base station-relay station resource allocation request indicating that allocation of the base station-relay station resource is requested,
   a base station-relay station resource allocation response-reception section configured to receive the base station-relay station resource information from the base station device, the base station-relay station resource information being a response to the base station-relay station allocation request and indicating the base station-relay station resource, and
   a base station-relay station resource information storage section configured to store the base station-relay station resource information, and
   a base station-side relay resource allocation request-transmission section configured to transmit a base station-side relay resource allocation request to the base station device, the base station-side relay resource allocation request indicating that allocation of a base station-side relay resource is requested, the base station-side relay resource being requested for a second radio signal to be transmitted/received between the base station device and the relay station device among radio signals transmitted/received between the base station device and a mobile station device via the relay station device,
wherein the base station-relay station resource corresponds to a first logical link between the relay station device and the base station device, the relay station device being an endpoint of the first logical link.

* * * * *